US012425425B2

(12) United States Patent
Healy et al.

(10) Patent No.: US 12,425,425 B2
(45) Date of Patent: Sep. 23, 2025

(54) USER-SOURCED OBJECT REPUTATIONS

(71) Applicant: McAfee, LLC, San Jose, CA (US)

(72) Inventors: Sorcha Bairbre Healy, County Cork (IE); Gerard Donal Murphy, County Cork (IE); Steven Grobman, Flower Mound, TX (US); Niall Fitzgerald, County Cork (IE); Jillian Anne Daly, Farnanes (IE); Sandeep Thakur, Kandaghat (IN); Brian Gaither, Prosper, TX (US); Niamh Minihane, Cork (IE); Catherine Costigan, Glasheen (IE)

(73) Assignee: McAfee, LLC, San Jose, CA (US)

( * ) Notice: Subject to any disclaimer, the term of this patent is extended or adjusted under 35 U.S.C. 154(b) by 293 days.

(21) Appl. No.: 17/066,629

(22) Filed: Oct. 9, 2020

(65) Prior Publication Data

US 2022/0116408 A1    Apr. 14, 2022

(51) Int. Cl.
*G06N 20/00*  (2019.01)
*H04L 9/40*  (2022.01)

(52) U.S. Cl.
CPC ......... *H04L 63/1425* (2013.01); *G06N 20/00* (2019.01)

(58) Field of Classification Search
CPC ............ H04L 63/1425; H04L 63/1416; H04L 63/1408; H04L 63/14; H04L 63/1433; G06N 20/00; G06N 3/04; G06N 3/084; G06N 5/003; G06N 20/20; G06F 2212/151; G06F 9/45533; G06F 21/53; G06F 2112/151
See application file for complete search history.

(56) References Cited

U.S. PATENT DOCUMENTS

| | | | |
|---|---|---|---|
| 10,628,834 B1* | 4/2020 | Agarwal | G06N 20/00 |
| 11,436,647 B1* | 9/2022 | Null | G06Q 10/107 |
| 2008/0052328 A1* | 2/2008 | Widhelm | H04L 63/1408 |
| 2009/0187442 A1* | 7/2009 | Kohanim | G06Q 10/10 705/1.1 |
| 2009/0300765 A1* | 12/2009 | Moskovitch | G06F 21/562 726/24 |
| 2013/0144818 A1* | 6/2013 | Jebara | G06Q 50/00 706/12 |
| 2013/0227089 A1* | 8/2013 | McLeod | G06F 9/45558 709/220 |
| 2015/0178631 A1* | 6/2015 | Thomas | G06N 5/047 706/12 |

(Continued)

*Primary Examiner* — Farid Homayounmehr
*Assistant Examiner* — Mudasiru K Olaegbe
(74) *Attorney, Agent, or Firm* — Patent Capital Group

(57) ABSTRACT

There is disclosed in one example a computing apparatus, including: a hardware platform including a processor circuit and a memory circuit; first means for accessing a machine learning engine; second means for accessing a user interface; and instructions encoded within the memory to instruct the processor to: load into the machine learning engine via the first means an object prevalence model, including an enterprise-specific prevalence model; provide to the machine learning engine an object set from the enterprise; identify an enterprise-novel object from the object set; solicit and receive via the second means user-sourced feedback for the enterprise-novel object; and act according to the user-sourced feedback.

20 Claims, 22 Drawing Sheets

(56) References Cited

U.S. PATENT DOCUMENTS

| | | | |
|---|---|---|---|
| 2016/0080399 A1* | 3/2016 | Harris | H04L 63/1433 |
| | | | 726/23 |
| 2016/0173525 A1* | 6/2016 | Thomas | H04L 63/145 |
| | | | 726/23 |
| 2018/0212837 A1* | 7/2018 | Kalluri | H04L 47/83 |
| 2019/0251251 A1* | 8/2019 | Carson | G06F 21/561 |
| 2019/0324731 A1* | 10/2019 | Zhou | G06F 8/427 |
| 2021/0021616 A1* | 1/2021 | Shabtai | H04L 63/1416 |
| 2021/0311762 A1* | 10/2021 | Shepherd | G06F 9/5077 |
| 2021/0400071 A1* | 12/2021 | Ray | H04L 63/1441 |
| 2022/0036302 A1* | 2/2022 | Cella | H04L 67/1097 |

* cited by examiner

USER-SOURCED OBJECT REPUTATIONS

FIELD OF THE SPECIFICATION

This application relates in general to computer security, and more particularly, though not exclusively, to a system and method for providing user-sourced object reputations.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
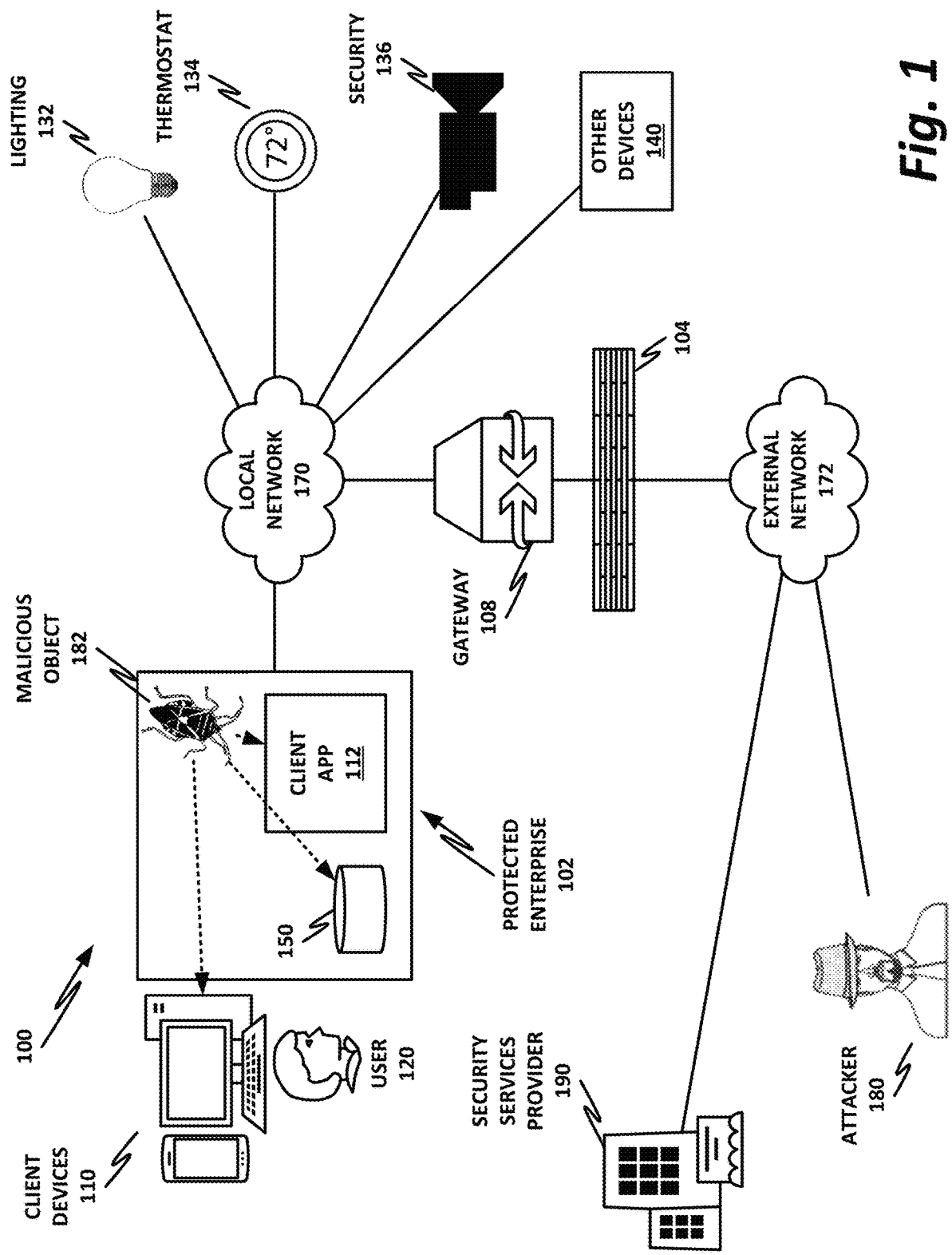
FIG. 1 is a block diagram of selected elements of a security ecosystem.

In an example, there is disclosed a computing apparatus, comprising: a hardware platform comprising a processor circuit and a memory circuit; first means for accessing a machine learning engine; second means for accessing a user interface; and instructions encoded within the memory to instruct the processor to: load into the machine learning engine via the first means an object prevalence model, including an enterprise-specific prevalence model; provide to the machine learning engine an object set from the enterprise; identify an enterprise-novel object from the object set; solicit and receive via the second means user-sourced feedback for the enterprise-novel object; and act according to the user-sourced feedback.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The machine learning models of the present specification can be improved by providing a machine learning model registry, in which enterprise-specific machine learning models may be stored and run periodically, such as nightly. For example, an enterprise that subscribes to a machine learning service may periodically upload newly discovered objects on the enterprise network to the machine learning service. Using an enterprise ID, the machine learning service can query a model registry for the enterprise-specific model for that enterprise. The machine learning service may then run the newly identified objects through the machine learning service, using the enterprise-specific model.

Based on the machine learning analysis, the newly discovered objects may be assigned a reputation based, for example, at least in part on their novelty. If the objects have a high novelty within the enterprise, in some cases it may be desirable to receive feedback from an enterprise security administrator about the newly discovered objects.

For example, consider a use case wherein a developer working for enterprise A is developing an enterprise-specific utility. This utility may have legitimate reasons for taking certain actions that are generally deemed suspicious, such as modifying the registry, executing with certain flags, or taking some other action. Thus, the object may be marked as suspicious, and indeed, behavioral analysis could also detect suspicious activities such as modifying the registry or accessing certain restricted system resources.

If these activities are done for a legitimate purpose, then the enterprise security administrator may wish to "greenlight" those objects, indicating that the newly discovered objects are not malicious, and should be allowed on the enterprise.

If this utility is under active development by a developer or developer team within the enterprise, then the object may change on a daily basis as developers check the latest version of the utility in to the new code base. As this occurs, the object may have some shared characteristics with the previous version, but may still have a relatively high novelty for the enterprise.

Periodically, such as when the enterprise security administrator logs into his console in the morning, he may be presented with a list of objects for which manual intervention is requested. Using an appropriate interface, such as a graphical user interface (GUI) or web interface, the enterprise administrator may take a desired action, such as green-lighting the objects, blocking the objects, or investigating the objects further. The administrator's feedback may then be incorporated into the enterprise-specific machine learning model, and the model will continue to learn about the object. Eventually, new versions that have enough shared features with old versions will begin to register a lower relative novelty, and there will be less need for the enterprise administrator to greenlight the objects. This realizes a useful balance between the machine learning algorithm being too autonomous, wherein it might strike a relatively large number of false positives, and pestering the enterprise administrator too frequently, wherein the usefulness of the enterprise console becomes more limited because of the amount of work simply to handle the daily "inbox" of newly discovered objects.

To build a machine learning model registry, the system may take certain actions for each customer. For example, for each customer, the system may identify new items such as hashes with portable executable (PE) static features, behavioral traces, and other information. This information may be augmented with up-to-date frequency and inverse frequency data, and other measures of similarity or dissimilarity that may be locally or globally defined for a threat intelligence backend.

Each day, the security administrator's feed may include a small number of items for which manual intervention is desirable. The administrator may have the option to greenlight the objects (mark them as known safe), block the objects (mark them as known malware), or mark the objects as novel and known or suspected malware. Using relatively short intervals, the system may retain a machine learning algorithm on the customer's history, augmented with globally collected information.

Each enterprise-specific machine learning model within the registry may include a diverse range of machine learning metrics that have been collected. These could include, by way of nonlimiting and illustrative example, false positive rate, detection rate, loss, pseudo-$R^2$, or similar. Furthermore, the accuracy of the models may be measured in the live backend system over a plurality of segments, including, for example, geographic segments, industry sector, operating system type, full traffic, or others.

Between training intervals, the machine learning interface may be generated for any new items in the customer feed, with a fresh set of collected features. Any items that the machine learning classifier deems to be "greenlit" may be suggested to the customer in a "greenlight feed," along with other similar historical items that the customer has greenlit in the past. This may make it relatively easy for the customer to scan through the greenlit items, verify that they should be allowed, and greenlight them. Indeed, the user interface may include an option to greenlight items in batches.

The internal similarity scoring mechanism discussed above may be used to provide this similarity measure.

Hashed items may be initially and retrospectively checked against a global database of known threats as a safety mechanism. If the administrator greenlights an object that appears in the global database, a follow-up query may be provided to ensure that the object was not accidentally greenlit.

At the end of a training cadence interval, if the customer has agreed or not disagreed with the suggestion, items will be incorporated into the training set, and a new model may be generated for the next interval period.

The foregoing can be used to build or embody several example implementations, according to the teachings of the present specification. Some example implementations are included here as nonlimiting illustrations of these teachings.

There is disclosed in one example a computing apparatus, comprising: a hardware platform comprising a processor circuit and a memory circuit; first means for accessing a machine learning engine; second means for accessing a user interface; and instructions encoded within the memory to instruct the processor to: load into the machine learning engine via the first means an object prevalence model, including an enterprise-specific prevalence model; provide to the machine learning engine an object set from the enterprise; identify an enterprise-novel object from the object set; solicit and receive via the second means user-sourced feedback for the enterprise-novel object; and act according to the user-sourced feedback.

There is further disclosed an example computing apparatus, wherein the object prevalence model further comprises a global prevalence model.

There is further disclosed an example computing apparatus, wherein the user-sourced feedback comprises an assigned reputation for the enterprise-novel object.

There is further disclosed an example computing apparatus, wherein the user-sourced feedback comprises green-lighting, yellow-lighting, or red-lighting the enterprise-novel object.

There is further disclosed an example computing apparatus, wherein the machine learning engine is to assign the enterprise-novel object a variance score comprising a distance between the enterprise-novel object and a next-nearest neighbor.

There is further disclosed an example computing apparatus, wherein the next-nearest neighbor is an object previously known to the enterprise.

There is further disclosed an example computing apparatus, wherein the next-nearest neighbor is a previous version of the enterprise-novel object.

There is further disclosed an example computing apparatus, wherein the instructions are further to determine that the distance is below a threshold, and not present the object for user-sourced feedback.

There is further disclosed an example computing apparatus, wherein the instructions are further to retrain the machine learning engine with the user-sourced feedback.

There is further disclosed an example computing apparatus, wherein the machine learning engine is to account for a plurality of metrics.

There is further disclosed an example computing apparatus, wherein the plurality of metrics includes at least one of accuracy, false positive rate, detection rate, loss, and pseudo $R^2$.

There is further disclosed an example computing apparatus, wherein the instructions are further to provide a live backend system.

There is further disclosed an example computing apparatus, wherein the live backend system is to measure model accuracy over a plurality of segments.

There is further disclosed an example computing apparatus, wherein the plurality of segments includes a segment selected from geographic, industry sector, operating system type, and traffic type.

There is further disclosed an example computing apparatus, wherein the instructions are further to instruct the user interface via the second means to present a feed of greenlit objects.

There is further disclosed an example computing apparatus, wherein the feed of greenlit objects includes similar objects to the greenlit objects.

There is further disclosed an example computing apparatus, wherein the instructions are further to query a global reputation database for a reputation for the enterprise-novel object.

There is further disclosed an example computing apparatus, wherein the instructions are further to present a proposed reputation for the enterprise-novel object.

There is further disclosed an example computing apparatus, wherein the instructions are provided within a guest infrastructure.

There is further disclosed an example computing apparatus, wherein the guest infrastructure comprises a virtualization infrastructure.

There is further disclosed an example computing apparatus, wherein the guest infrastructure comprises a containerization infrastructure.

There is also disclosed an example of one or more tangible, non-transitory computer-readable storage media having stored thereon executable instructions to: provide a feedback application programming interface (API); provide a machine learning API; operate the machine learning API to instruct a machine learning engine to load an existing model, the existing model comprising distance data for enterprise binary objects for an enterprise and global binary objects; receive one or more newly-encountered enterprise objects; solicit and receive via the feedback API feedback on a newly-encountered object; and instruct the machine learning engine to incorporate the feedback into the existing model.

There is further disclosed an example of one or more tangible, non-transitory computer-readable storage media, wherein the machine learning engine is pre-trained on a prevalence model.

There is further disclosed an example of one or more tangible, non-transitory computer-readable storage media, wherein the existing model further comprises a global prevalence model.

There is further disclosed an example of one or more tangible, non-transitory computer-readable storage media, wherein the feedback comprises an assigned reputation for the newly-encountered object.

There is further disclosed an example of one or more tangible, non-transitory computer-readable storage media, wherein the feedback comprises green-lighting, yellow-lighting, or red-lighting the newly-encountered object.

There is further disclosed an example of one or more tangible, non-transitory computer-readable storage media, wherein the machine learning engine is to assign the newly-encountered object a variance score comprising a distance between the newly-encountered object and a next-nearest neighbor.

There is further disclosed an example of one or more tangible, non-transitory computer-readable storage media, wherein the next-nearest neighbor is an object previously known to the enterprise.

There is further disclosed an example of one or more tangible, non-transitory computer-readable storage media, wherein the next-nearest neighbor is a previous version of the newly-encountered object.

There is further disclosed an example of one or more tangible, non-transitory computer-readable storage media, wherein the instructions are further to determine that the distance is below a threshold, and not present the newly-encountered object for user-sourced feedback.

There is further disclosed an example of one or more tangible, non-transitory computer-readable storage media, wherein the instructions are further to retrain the machine learning API with user-sourced feedback.

There is further disclosed an example of one or more tangible, non-transitory computer-readable storage media, wherein the machine learning API is to account for a plurality of metrics.

There is further disclosed an example of one or more tangible, non-transitory computer-readable storage media, wherein the plurality of metrics includes at least one of accuracy, false positive rate, detection rate, loss, and pseudo $R^2$.

There is further disclosed an example of one or more tangible, non-transitory computer-readable storage media, wherein the instructions are further to provide a live backend system.

There is further disclosed an example of one or more tangible, non-transitory computer-readable storage media, wherein the live backend system is to measure model accuracy over a plurality of segments.

There is further disclosed an example of one or more tangible, non-transitory computer-readable storage media, wherein the plurality of segments includes a segment selected from geographic, industry sector, operating system type, and traffic type.

There is further disclosed an example of one or more tangible, non-transitory computer-readable storage media, wherein the instructions are further to instruct the feedback API to present a feed of greenlit objects.

There is further disclosed an example of one or more tangible, non-transitory computer-readable storage media, wherein the feed of greenlit objects includes similar objects to the greenlit objects.

There is further disclosed an example of one or more tangible, non-transitory computer-readable storage media, wherein the instructions are further to query a global reputation database for a reputation for the newly-encountered object.

There is further disclosed an example of one or more tangible, non-transitory computer-readable storage media, wherein the instructions are further to present a proposed reputation for the newly-encountered object.

There is further disclosed an example of one or more tangible, non-transitory computer-readable storage media, wherein the instructions are provided within a guest infrastructure.

There is further disclosed an example of one or more tangible, non-transitory computer-readable storage media, wherein the guest infrastructure comprises a virtualization infrastructure.

There is further disclosed an example of one or more tangible, non-transitory computer-readable storage media, wherein the guest infrastructure comprises a containerization infrastructure.

There is also disclosed an example computer-implemented method of providing user-sourced reputation adjustments to an artificial intelligence malware detection engine, comprising: computing a baseline reputation for an object via the artificial intelligence malware detection engine, including a global and local prevalence model; identifying a novel object within an enterprise; assigning the novel object a base reputation according to the artificial intelligence malware detection engine; and adjusting the base reputation according to user-sourced feedback on the novel object.

There is further disclosed an example method, wherein the user-sourced feedback comprises an assigned reputation for the novel object.

There is further disclosed an example method, wherein the user-sourced feedback comprises green-lighting, yellow-lighting, or red-lighting the novel object.

There is further disclosed an example method, wherein the artificial intelligence malware detection engine is to assign the novel object a variance score comprising a distance between the novel object and a next-nearest neighbor.

There is further disclosed an example method, wherein the next-nearest neighbor is an object previously known to the enterprise.

There is further disclosed an example method, wherein the next-nearest neighbor is a previous version of the novel object.

There is further disclosed an example method, further comprising determining that the distance is below a threshold, and that the novel object is not to be presented for user-sourced feedback.

There is further disclosed an example method, further comprising retraining the artificial intelligence malware detection engine according to the user-sourced feedback.

There is further disclosed an example method, wherein the artificial intelligence malware detection engine is to account for a plurality of metrics.

There is further disclosed an example method, wherein the plurality of metrics includes at least one of accuracy, false positive rate, detection rate, loss, and pseudo $R^2$.

There is further disclosed an example method, further comprising providing a live backend system.

There is further disclosed an example method, wherein the live backend system is to measure model accuracy over a plurality of segments.

There is further disclosed an example method, wherein the plurality of segments includes a segment selected from geographic, industry sector, operating system type, and traffic type.

There is further disclosed an example method, further comprising providing a user interface to present a feed of greenlit objects.

There is further disclosed an example method, wherein the feed of greenlit objects includes similar objects to the greenlit objects.

There is further disclosed an example method, further comprising querying a global reputation database for a reputation for the novel object.

There is further disclosed an example method, further comprising presenting a proposed reputation for the novel object.

There is further disclosed an example method, further comprising providing user-sourced reputation adjustments within a guest infrastructure.

There is further disclosed an example method, wherein the guest infrastructure comprises a virtualization infrastructure.

There is further disclosed an example method, wherein the guest infrastructure comprises a containerization infrastructure.

There is further disclosed an example apparatus comprising means for performing the method of a number of the above examples.

There is further disclosed an example apparatus, wherein the means for performing the method comprise a processor and a memory.

The is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

A system and method for providing user-sourced reputations will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 may be an advanced persistent threat (APT), a fileless attack, a PE, or some other attack on the enterprise. Security researchers within the enterprise may need to investigate thousands of such malicious or potentially malicious objects, and thus it is advantageous to be able to prioritize the investigation of objects.

For example, if malicious object 182 has a high uniqueness score, both globally and with respect to the enterprise, then it may be prioritized for inspection and analysis.

Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known.

However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
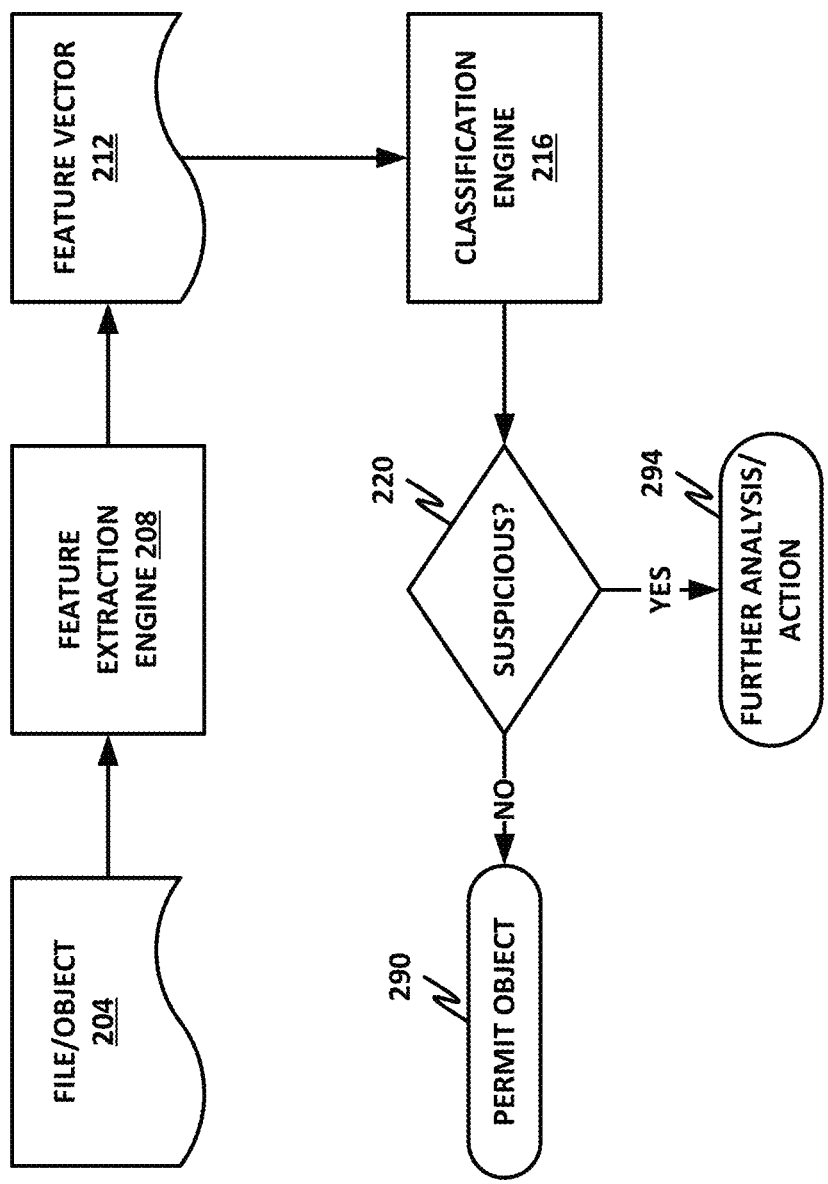
FIG. 2 is a block diagram of selected aspects of a traditional malware analysis.

FIG. 2 is a block diagram of selected aspects of a traditional malware analysis. The workflow of FIG. 2 may be performed for example in an enterprise, or by a security services provider. In one example, the work flow is performed by an enterprise server, such as one existing as a virtual network function (VNF), or as part of a service function chain that utilizes software-defined networking (SDN) to connect VNFs in a virtual chain.

In this example, a new file or object 204 is encountered by the enterprise. The new file or object may not have a known reputation on the enterprise. If object 204 has a known reputation, then the known reputation can simply be applied. For example, if the known reputation is good, the object can simply be permitted to operate on the network according to its intended function. On the other hand, if the object is known to be bad, then it can be blocked by enterprise gateways and other resources before it ever enters the enterprise network. In one example, an enterprise workflow includes a malware scanner that applies known reputations to known objects, including known malicious objects.

Assuming that object 204 does not have a known reputation, and therefore requires additional analysis by the enterprise, a feature extraction engine 208 may analyze object 204 to extract features from the object. Feature extraction engine 208 may extract both static and dynamic features. Many different static and dynamic features are available. In an embodiment, static features include those listed in Table 1 below, by way of illustrative and nonlimiting example.

TABLE 1

Example Static Features for Malware Samples

| | |
|---|---|
| hex_filesize | The size of the file |
| hex_filelines | The number of rows in the byte view of the file |
| hex_str_len | The number of the corresponding length of string in the file |
| hex_1gram | The number of characters in the file |
| hex_entropy | The file's entropy |
| asm_register | The number of registry keys accessed or modified by the file |
| asm_opcode | The number of opcodes recognized |
| asm_dd | The number of occurrences of the pseudo instruction "dd" |

TABLE 1-continued

Example Static Features for Malware Samples

| | |
|---|---|
| asm_dw | The number of occurrences of the pseudo instruction "dw" |
| asm_symbol | The number of special symbols |
| pe_api | The number of suspicious API class |
| pe_dll | The number of dynamic link libraries (DLLs) accessed by the file |
| pe_imports | The number of imports |
| pe_exports | The number of exports |
| pe_mastiff | The information of Mastiff Report |
| pe_alertapi | The statistic number of malicious API |
| pe_compile | The compiling environment of sample |

Hexadecimal Bytecode Features

Bytecode can be observed as a series of hexadecimal character arrangement. It is the original form of malware and shows the fundamental outline of malware. Feature collection can directly read through the hexadecimal bytecode, and feature details are as follows:

File Size: Basic file information including the file size, number of file lines, and total number of file characters.

Visible String: Includes statistics of visible ASCII strings' length, with filters applied to reduce noise.

Program Entropy: The entropy of the program is a measure of the amount of disorder, which is a reflection of whether the malware sample obfuscates itself or makes other changes.

Assembler Code Features

Interactive Disassembler (IDA) is a static disassembly tool that supports multi-platform applications. IDA performs automatic code analysis, using cross-references between code sections, knowledge of parameters of API calls, and other information.

Register Features: The register is an important part of the assembly language, and different compilation environments have great influence on the type of compiler function register. The number of various types of registers may be extracted from the compiler function register.

Operation Code (Opcode): Opcode is a visual representation of the machine code, which is the most frequent element in the assembly language.

Data Definition Features: Considers some statistical information of data definition opcodes orders such as "db", "dd," and "dw." In the analysis of the shelling sample process, these samples are mainly made up of "db", "dd" and "dw" opcodes. Extracting these features may help to classify the shelling samples.

Portable Executable Structure View Feature

In cases where malware is delivered as a PE, the PE header contains a large amount of software-related information. Software such as Exeinfo PE and Mastiff may be used to extract features related to the structure of executable objects. Mastiff is an open source command-based static analysis framework developed by the Defense Advanced Research Projects Agency (DARPA). It is mainly used to extract the structured information of PE files, and also supports the development of related plugins to provide static analysis of PDF, Word, and other format files. Exeinfo PE may be used by developers to check the compiler environment and maintain the compiler information database. The batch function provided by Exeinfo PE may be used to check the shelling information contained in malware. The PE structure features and compiler environment features provided by Mastiff and Exeinfo PE may be combined as PE structure view features, as detailed below.

PE Structured Information

The PE header contains a large number of software-related deep-level data, with related semantic information that can be analyzed. Important structural features may be extracted, including the number of API calls, the number of DLL calls, the number of import functions, the number of export functions, the starting virtual address, virtual size, language, and others.

Anti-Detection Features

Mastiff analysis reveals a series of antivirus measures made by malicious samples. Example malicious features include packers, virtual escape techniques, anti-debug techniques, and anti-virtual machine techniques.

Compile Features

The compilation time of the software and the compilation environment may be extracted, as well as shelling information. According to the difference of compiled information, accuracy of the characteristics of the compiler environment may be verified.

Malicious APIs

Researchers have analyzed more than 50 million malicious samples, arriving at the top 500 frequent APIs used by malware objects. In an illustrative example, the first 100 of these are considered, and their frequency is measured as a malicious API feature.

It should be noted that, although static features are disclosed here by way of illustration, dynamic features may also be used. Dynamic features could include, for example, behavioral features. Behavioral features include the behavior of the object while executing. The behavior can be observed and featurized, so that certain behaviors act as individual tokens for analysis.

Feature extraction engine 208 builds a feature vector 212 for object 204. Feature vector 212 includes a list of all the features extracted by feature extraction engine 208.

Feature vector 212 is provided to a classification engine 216. Classification engine 216 can analyze feature vector 212 in comparison to other features, to determine whether object 204 is likely to be malware. Classification engine 216 can thus make a determination based on the extracted features of whether the object is suspicious or not.

At decision block 220, the system determines whether the object is deemed suspicious or not. If the object is not deemed suspicious, then the object may simply be permitted at block 290. If the object is deemed suspicious, then at block 294, further analysis may be required.

Figure 3:
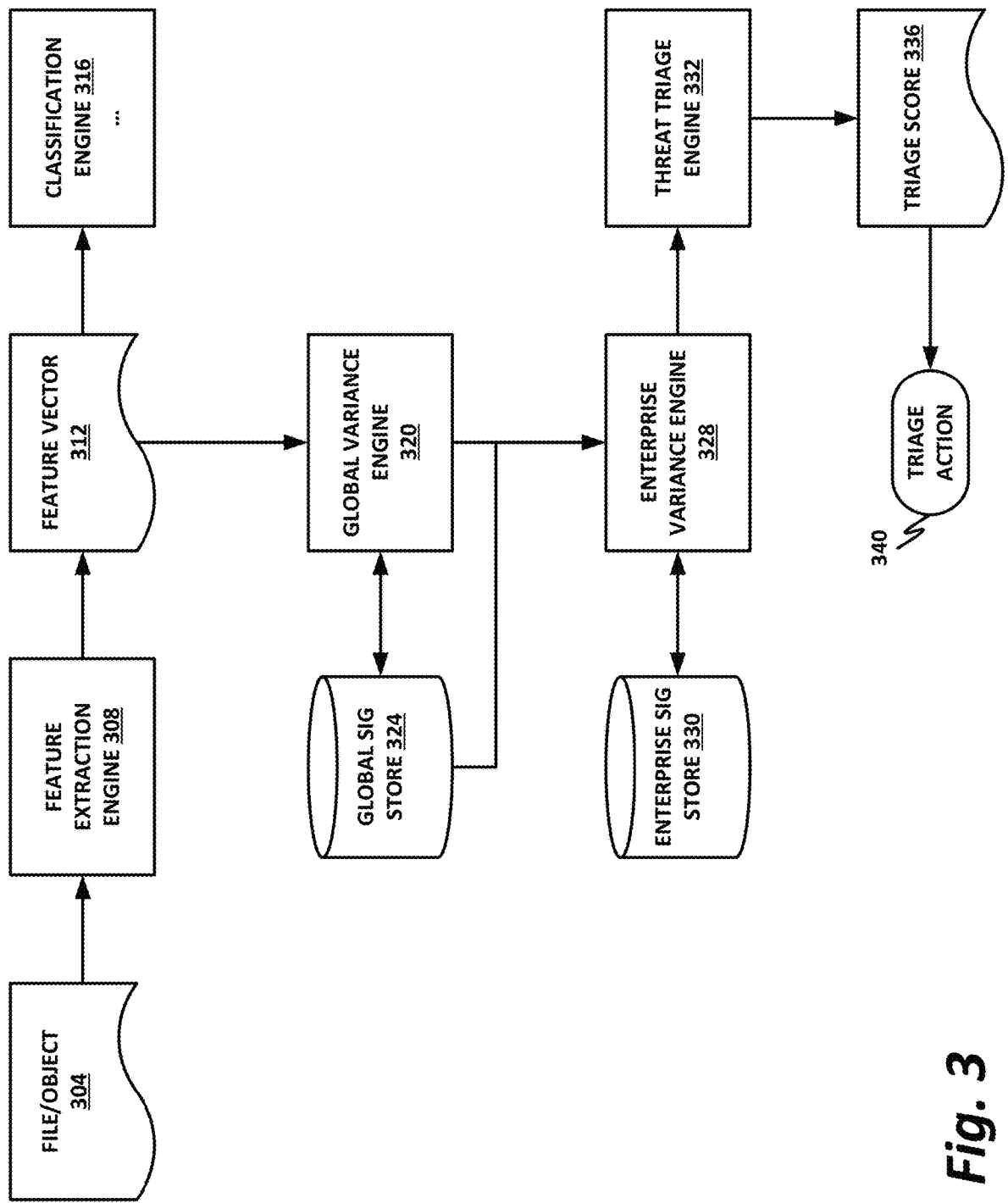
FIG. 3 is a block diagram illustrating additional selected aspects of a security system.

FIG. 3 is a block diagram illustrating additional selected aspects of a security system. In this example, a new file or object 304 is encountered by the enterprise. The new file or object may not have a known reputation on the enterprise. If object 304 has a known reputation, then the known reputation can simply be applied. For example, if the known reputation is good, the object can simply be permitted to operate on the network according to its intended function. On the other hand, if the object is known to be bad, then it can be blocked by enterprise gateways and other resources before it ever enters the enterprise network. In one example, an enterprise workflow includes a malware scanner that applies known reputations to known objects, including known malicious objects.

Assuming that object 304 does not have a known reputation, and therefore requires additional analysis by the enterprise, then a feature extraction engine 308 may analyze object 304 to extract features from the object. Feature extraction engine 308 may extract both static and dynamic features. Many different static and dynamic features are available. In addition to the static features listed in Table 1 above, it should be noted that dynamic features may also be used. Dynamic features could include, for example, behavioral features. Behavioral features include the behavior of the object while executing. The behavior can be observed and featurized, so that certain behaviors act as individual tokens for analysis.

Feature extraction engine 308 builds a feature vector 312 for object 304. Feature vector 312 includes a list of all the features extracted by feature extraction engine 308. From feature vector 312, classification engine 316 classifies the object as suspicious or not. This is similar to classification engine 216 of FIG. 2.

The workflow of FIG. 3 also includes additional aspects, besides determining via classification engine 316 whether the object is suspicious. Specifically, this workflow illustrates other information that may be inferred from feature vector 312.

As described above, feature vector 312 may include both static and dynamic features. These static and dynamic features can be used in some embodiments to provide clustering of feature sets.

Figure 5:
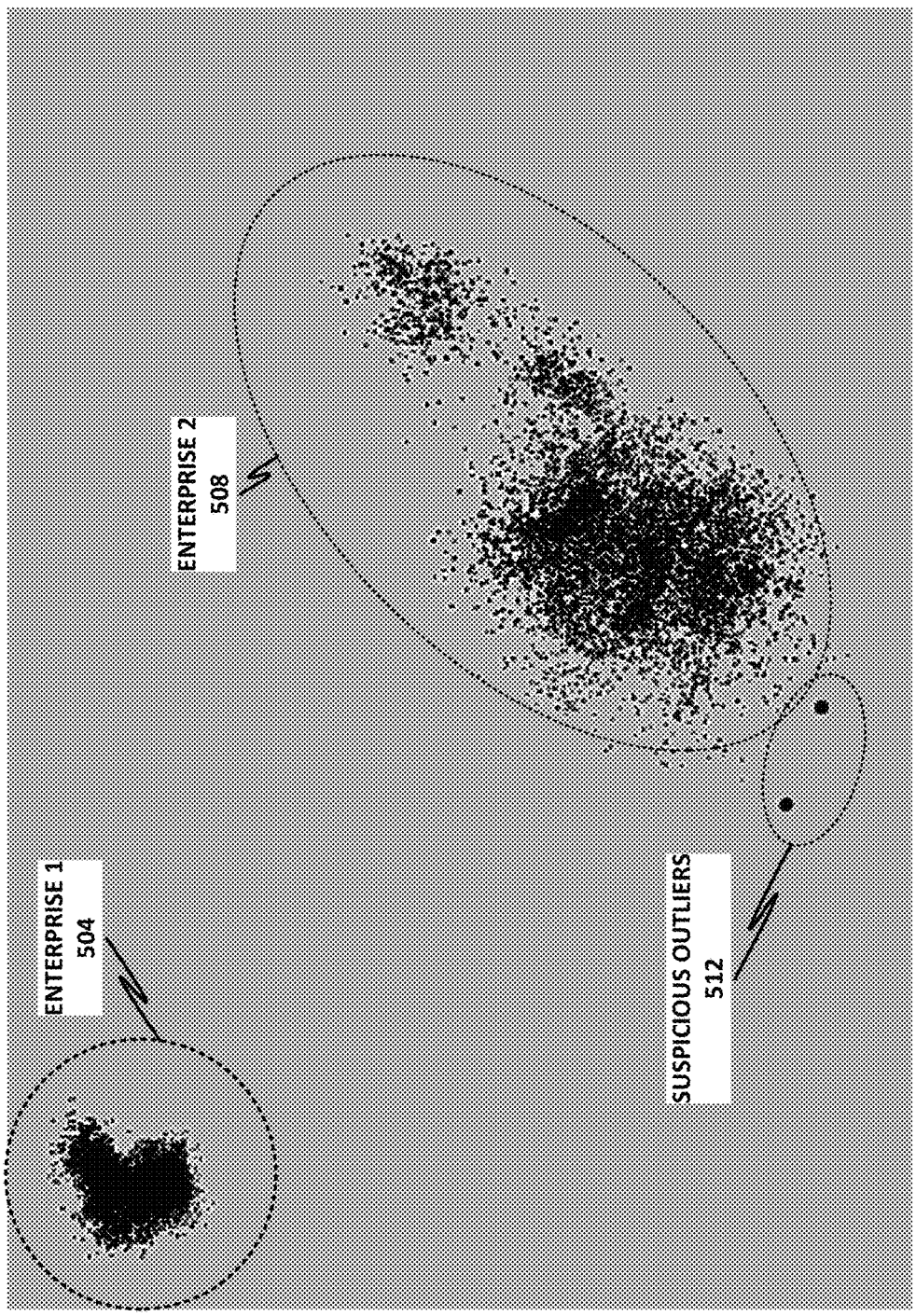
FIG. 5 illustrates clustering of feature sets.

Such clustering is illustrated in FIG. 5, where a machine learning algorithm such as the Hariri isolation forest algorithm is used to group similar objects. These objects cluster into "galaxies" of similarity, and may be clustered by enterprise. As illustrated in FIG. 5, enterprise 1 includes a first cluster 504, while enterprise 2 includes a second cluster 508. These clusters show similarity of shared features between various objects. In general, the more similar the feature vectors are for the two objects, the closer they are to each other. It should be noted that while FIG. 5 necessarily illustrates the clustering in a two-dimensional space, clustering can actually be calculated in a three-dimensional space. Thus, the illustration of FIG. 5 may be understood to represent a two-dimensional view of a three-dimensional space.

The teachings of the present specification, including the workflow of FIG. 3, can be used to identify suspicious outliers 512.

Figure 4:
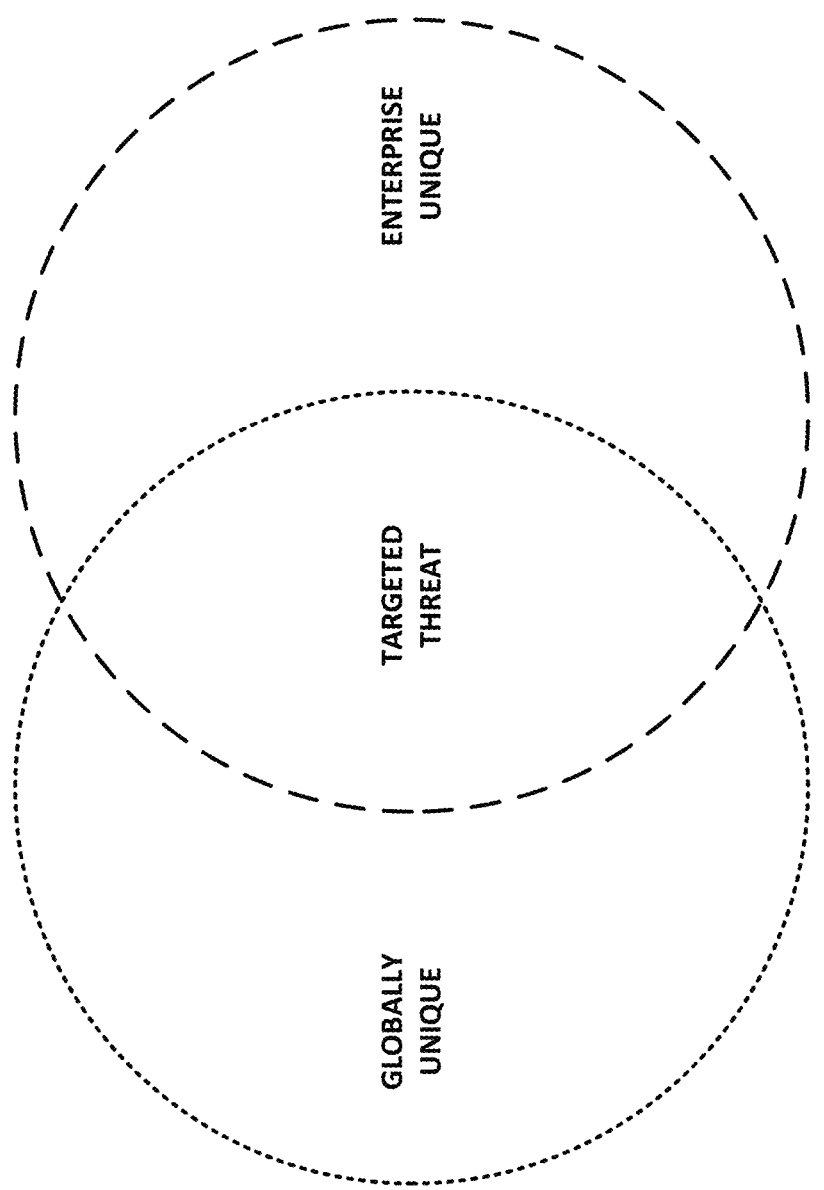
FIG. 4 illustrates a Venn diagram for identifying suspicious outliers.

FIG. 4 illustrates a Venn diagram for identifying suspicious outliers. Specifically, in the Venn diagram of FIG. 4, some objects are globally unique, while other objects are enterprise unique. Viewing suspicious outliers 512 of FIG. 5, it can be seen that suspicious outliers 512 meet both criteria. They appear near enterprise 2, and thus may represent an attack on enterprise 2. But they do not cluster well with either enterprise 1 or enterprise 2, or with any other global data. Thus, suspicious outliers 512 have both high global uniqueness and high enterprise uniqueness. As described above, this combination of uniqueness makes it more likely that suspicious outliers 512 could represent a targeted attack on enterprise 2.

Returning to the workflow of FIG. 3, feature vector 312 can be used to determine whether an object has high enterprise and/or global variance. This can be done by computing a variance between a selected set of known objects, and determining the uniqueness.

Thus, a global variance engine 320 operates with a global signature store 324. Global signature store 324 includes signatures of a large number of known global objects. Global signature store 324 may also include a pre-trained machine learning model, such as a Hariri model, from which variance can be calculated. Global variance engine 320 can then calculate how well the newly-encountered object clusters with other objects within global signature store 324.

Enterprise variance engine 328 can then compute how well the new object clusters with other objects known to the enterprise. Enterprise variance engine 328 can query an enterprise signature store 330 to provide a baseline for enterprise signatures, as well as a pre-trained model for that enterprise.

Global variance engine 320 and enterprise variance engine 328 can both provide a variance score that threat triage engine 332 can use to evaluate the seriousness of the threat. If both global variance engine 320 and enterprise variance engine 328 provide a relatively high score (e.g., a score above a given threshold), then threat triage engine 332 may assign a high triage score 336. On the other hand, if the new object lacks either high enterprise uniqueness or high global uniqueness, then threat triage engine 332 may assign a relatively lesser triage score 336. Note that triage score 336 is not necessarily a measure of the maliciousness of object 304. That maliciousness score may be assigned by classification engine 316. Rather, triage score 336 represents the importance of providing more detailed analysis of object 304, if it is found to be malicious. In other words, not all malicious objects warrant the same degree of urgency in investigation. An APT, for example, may warrant more urgent or immediate investigation than a piece of generalized malware.

Thus, triage action 340 may include providing object 304 to an existing security infrastructure and/or to human security experts for investigation. The urgency of that investigation may be informed by triage score 336.

Figure 6:
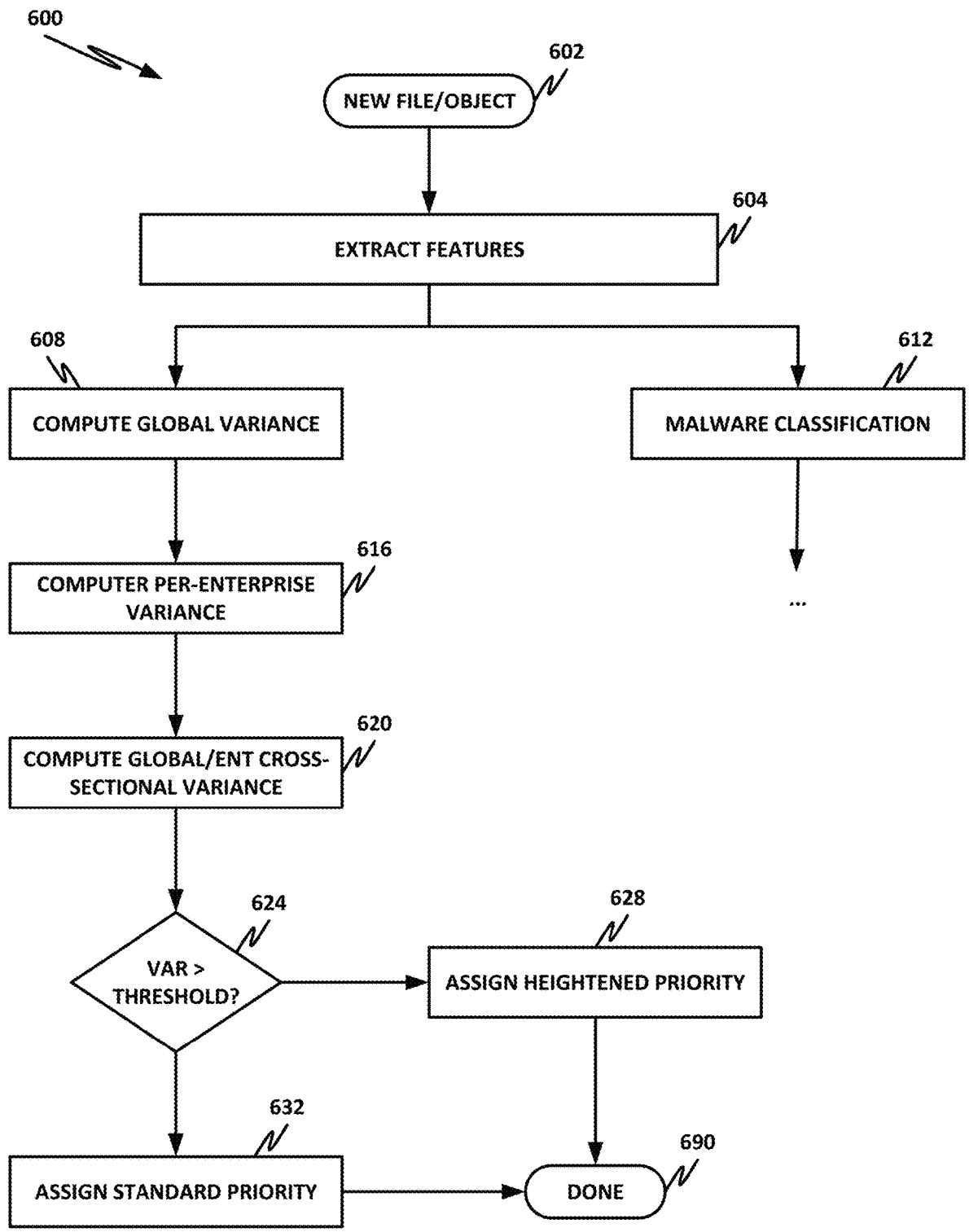
FIG. 6 is a flowchart illustrating a method of prioritizing investigation within an enterprise.

FIG. 6 is a flowchart of a method 600 of prioritizing investigation within an enterprise.

Starting at block 602, a new file or object is encountered within the enterprise. This new file or object may require additional investigation.

After features have been extracted in block 604, parallel processes may occur. In block 612, malware classification may occur, as illustrated in FIG. 2. This malware classification may be done according to known methods.

In parallel with malware classification 612, additional processing may be performed, such as triaging, as illustrated in FIG. 3.

In block 608, a device such as a global variance engine may compute a global variance for the new object. The global variance measures the uniqueness of the object in the context of a global database. This measure may be performed, in one example, by a security services provider such as security services provider 190 of FIG. 1. The security services provider advantageously has the ability to see a global perspective of new objects, and thus is well-positioned to identify a global variance.

In block 616, an agent such as an enterprise variance engine computes per-enterprise variance for the new object. In some embodiments, this may be performed at the enterprise, itself. However, in other embodiments, this may also be performed at a security services provider. In that case, the security services provider has the advantageous ability to offer its clients the additional service of being able to notify them when an attack appears to be occurring on the enterprise. In some examples, the security services provider computes enterprise variances for a plurality of enterprises, and identifies an enterprise if an object requires further analysis.

In block 620, an appropriate engine such as a threat triage engine may compute a global and enterprise cross-sectional variance, as illustrated by the Venn diagram in FIG. 4. A newly identified object that has both high global variance and high enterprise variance may represent a more substantial threat to that enterprise.

In decision block 624, the system determines whether the cross-sectional variance is greater than a threshold. If the cross-sectional variance is greater than the threshold, then in block 628, the system may assign a heightened priority to the object.

Returning to decision block 624, if the cross-sectional variance is not greater than the threshold, then in block 632, the object may be assigned a standard priority.

In block 690, the method is done.

Figure 7A:
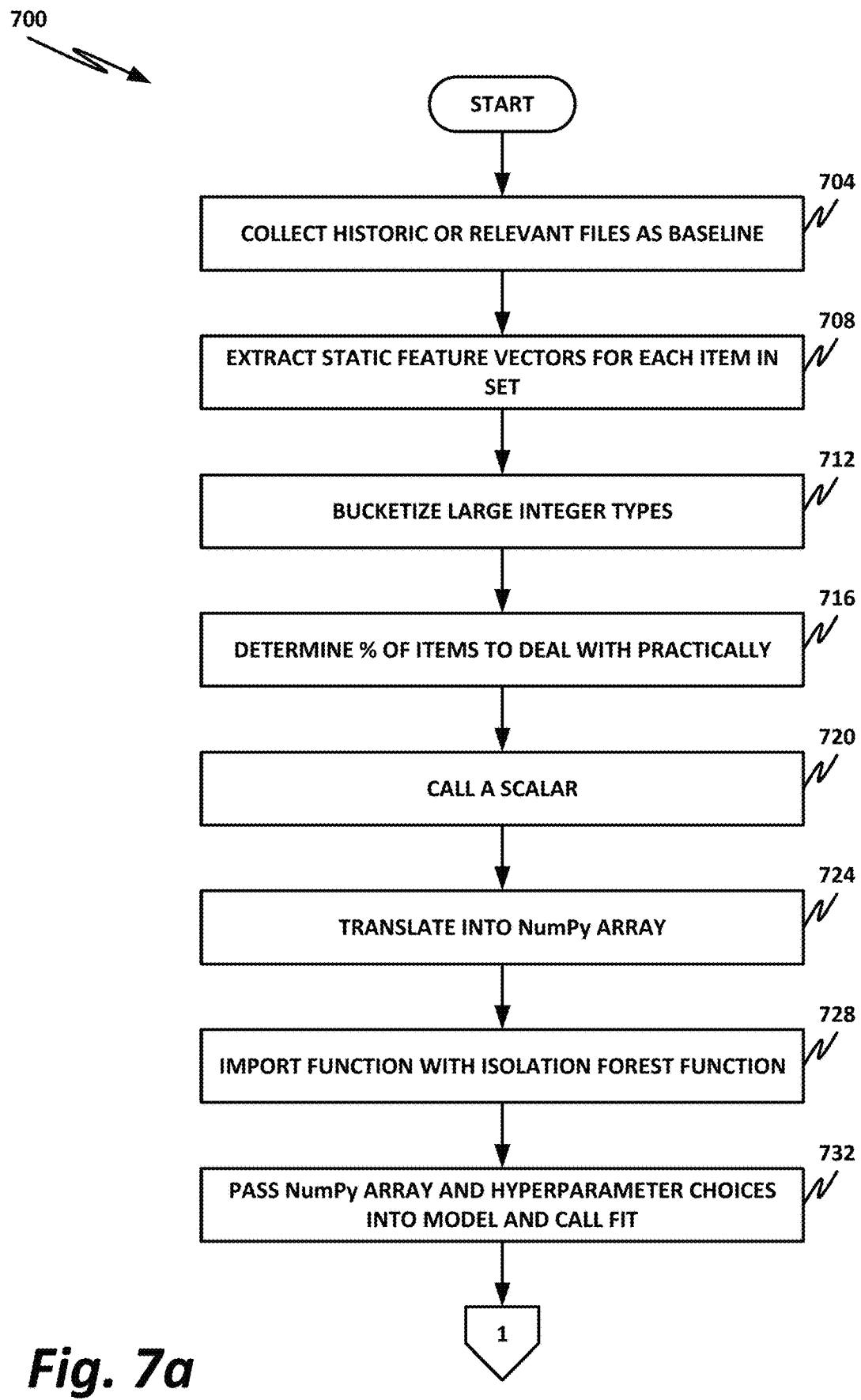
FIGS. 7*a*-7*b* are a flowchart representing additional selected steps for assigning a priority to an object.
Figure 7B:
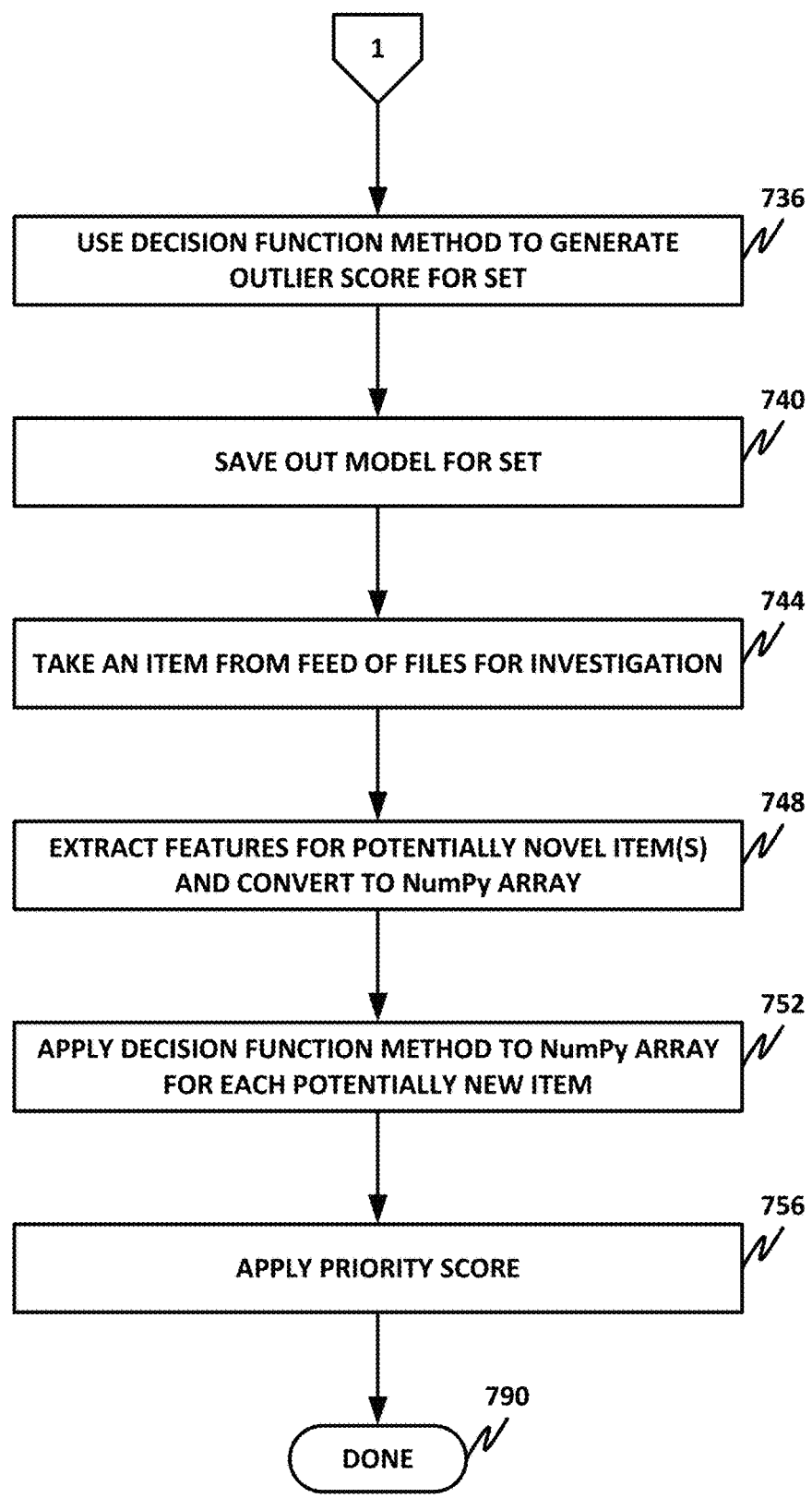

FIGS. 7a-7b are a flowchart 700 representing additional selected steps for assigning a priority to an object. Note that in some embodiments, the operations of method 700 may, in some cases, intersect with the operations of method 600. The two flowcharts are provided separately to illustrate different aspects of the teachings of the present specification.

Starting in block 704, the system may collect a historic or specific relevant set of files, such as PEs, APTs, fileless attacks, or others. This may represent a set of objects that can form a baseline. Variance can be computed using these objects as a baseline. The objects may be malware, legitimate software, a software family, or other objects that can be used as a baseline.

In block 708, the system extracts static and/or dynamic features for each item in the set.

At block 712, the system may optionally bucketize large integer types. In other words, large integer-type features, such as file size for example, may be bucketed into more discrete buckets. Note that in at least some embodiments, this is automatically done by the random forest algorithm. But if scalability is an issue, this step aids in deduplication of the data set.

In block 716, the system or a system programmer determines a percentage or a subsection of the items that can be dealt with practically in the current model. The system may then set a contamination level to be this fraction that is to be segregated. The contamination level is the algorithm variable used to indicate the proportion of the items that are likely to be very different. It can be used to provide a mechanism of restriction the items to be examined in detail.

In block 720, the system may call a scalar. Note that calling a scalar may not be strictly necessary, but in at least some embodiments, may be helpful in plotting some items.

In block 724, the set of objects may be translated into an array. In one example, Numerical Python (NumPy) may be used as a convenient library or add-on to the Python programming language that is particularly suited to numerical calculations of this type. Thus, in at least some embodiments, the array may be a NumPy array.

In block 728, the system (e.g., Python) imports a function with an isolation forest function. In some embodiments, this may include loading al off-the-shelf library that provides the appropriate algorithm (e.g., isolation forest, or extended isolation forest). This library provides a model that can then be trained on the appropriate dataset.

In block 732, the system passes the NumPy array and a set of hyperparameter choices into the model. The system may then call the "fit" subroutine of the model.

Following off-page connector 1 to FIG. 7b, in block 736, the system may use a decision function method to generate an outlier score for the data set in question. This outlier score represents a variance of an object under analysis from a baseline. In this case, an outlier score is generated for each object in the training set, and this vector of outlier scores can be used to generate a "galaxy" of clustered objects.

In block 740, the system saves out the model for this set.

In block 744, the system may begin to analyze a feed of incoming objects, such as new files, PEs, or other objects that are provided for investigation. In block 744, the system takes a next item from the feed of files for investigation.

In block 748, the system extracts features for potentially novel items, and converts those to a NumPy array, as described above.

In block 752, the system applies the decision function method to the NumPy array for each of the potentially new items. This yields an individual variance score for the item. The variance score could be a global variance score or an enterprise variance score, depending on the data set.

In block 756, the system applies the computed priority score to the object. This may include assigning a cross-sectional variance score for triaging purposes.

Figure 8:
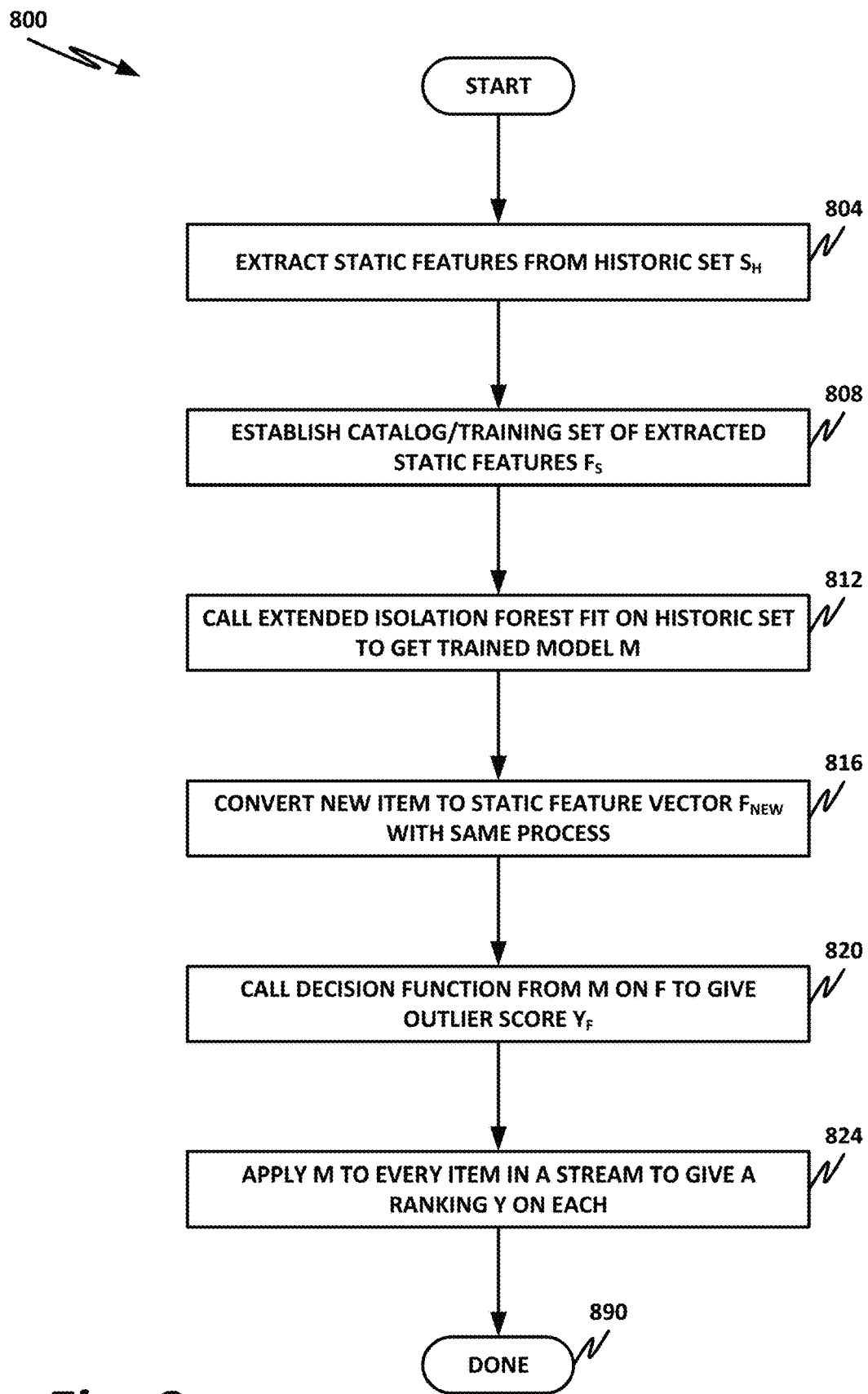
FIG. 8 is a flowchart of a method, according to the teachings of the present specification.

FIG. 8 is a flowchart of a method 800 that may be performed by a system, according to the present specification. Note that at least some of the operations of method 800 intersect with at least some of the operations of methods 600 and 700, as described above. This is not intended to imply mutual exclusivity between the methods, but rather, the different flowcharts focus on various aspects of the disclosed methods.

In general terms, method 700 provides a "computer science" view of the process, whereas method 800 is more focused on a mathematical description of the process. Both flow charts illustrate the use of historical data sets to custom tune the parameters in a complex mathematical function that is encoded within a Python machine learning library. When new items are passed into the "trained" mathematical function, the algorithm provides a score on the new item to indicate how unusual it is compared to the items in the historical set.

Method 800 particularly describes the application of a machine learning algorithm, such as the Hariri decision tree forest.

The Hariri decision tree forest is described in more detail in the academic paper Extended Isolation Forest, which is incorporated herein by reference.

In block 804, according to the teachings of the machine learning model, the system extracts a set of static or other features from a historic data set $S_H$.

In block 808, the system establishes a catalog or a training set of extracted static features $F_S$.

In block 812, the system calls an extended isolation forest fit on the historic set to get a trained model M.

In block 816, the system converts the new item to a static feature vector $K_{NEW}$ using the same process that was used to establish the training set in block 808. Thus, a feature vector is provided for the new data set, and can be usefully compared to a set of static features for the training data set established in block 808.

In block 820, the system calls the decision function from "M" on "F" (a feature set) to yield a new outlier score $Y_F$. This outlier score is a representation of the uniqueness of the new feature set in comparison to the feature sets in the training model M.

In block 824, the system applies M to every item in a stream (such as an incoming stream of objects for analysis) to provide a ranking Y for each object.

In block 890, the method is done.

Figure 9:
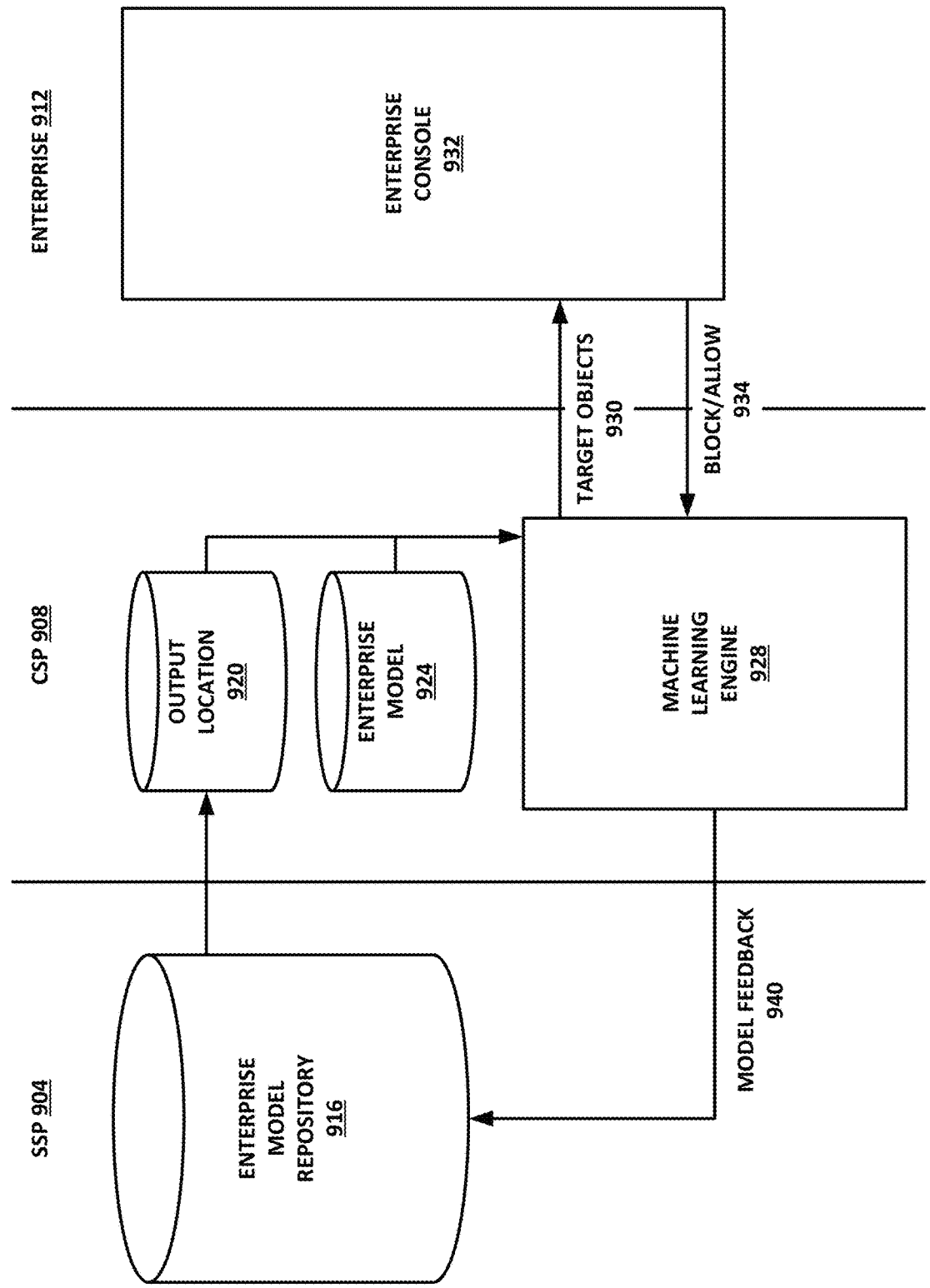
FIG. 9 is a block diagram of selected elements of a security ecosystem.

FIG. 9 is a block diagram of selected elements of a security ecosystem. In this case, the security ecosystem includes an enterprise 912, a cloud service provider 908, and a security services provider (SSP) 904. In the illustrated example, enterprise 912 may contract with SSP 904 for security to protect enterprise 912 from external threats. SSP 904 may work with cloud service provider (CSP) 908. CSP 908 may provide a hardware and/or software ecosystem, wherein SSP 904 can provision guest services such as virtual machines or containers on the hardware of CSP 908.

Enterprise 912 includes an enterprise console 932. Enterprise console 932 could be a web interface, served either locally to enterprise 912 or from another location, such as from SSP 904 or CSP 908. Enterprise console 932 could also be a locally running program, which may run as a native operating system, program, or service, or which could itself be provided within a virtual machine or a container within a virtual machine, a container, as a snap package manager, or other prepackaged item.

Enterprise console 932 may include an interface, such as a GUI that provides functionality for a security administrator of enterprise 912 to perform administrative functions. This could include, for example, a notification framework wherein the administrator is notified of new threats or events within enterprise 912. These could include target objects 930 provided to enterprise console 932 from various sources, including from a machine learning engine 928, which may be hosted on CSP 908. After reviewing the new objects on enterprise console 932, the administrator may make decisions about whether to allow, block, further investigate, or otherwise handle the target objects. The GUI could include a feature, for example, to greenlight, redlight, or yellowlight an object, indicating that the object is allowed, blocked, or suspicious, respectively. Decisions taken by the administrator on enterprise console 932 may be provided back to machine learning (ML) engine 928.

CSP 928 has access to an enterprise model repository 916, provided by SSP 904. Enterprise model repository 916 includes specific models, such as enterprise models for different protected enterprises. Thus, enterprise model repository 916 may include a model that is specific to enterprise 912. On a schedule or on a trigger, ML engine 928 may fetch the model from enterprise model repository 916 of SSP 904, which is sent to an output location 920. Enterprise model 924 is then retrieved from output location 920, and loaded into ML engine 928. As discussed above, this model may, at least in part, measure the uniqueness of certain objects encountered on the enterprise. This uniqueness may vary across different enterprises, and may be indicative of different things to different enterprises. For example, if enterprise 912 is actively developing a utility, that utility may show up as unique the first time it is encountered within enterprise 912. This object may be provided to ML engine 928, and in its periodic scan for new malicious objects, ML engine 928 may investigate the newly identified object. In this case, the object would not be expected to have a known reputation, because the object is entirely new. Certain portions of the object may have existing reputations, such as if the object uses a known toolkit, application programming interface (API), development kit, or other known utility. Thus, there may be a partial reputation, but because the object itself is unique, it may be desirable to assign it a reputation. ML engine 928 may analyze the object, such as via static analysis, dynamic analysis, inspection by a computer vision system for classification, or via other means to assign a preliminary reputation to the object. The object may then be designated as a target object 930, and be provided to enterprise console 932. The next time the security administrator logs into enterprise console 932, the console may request the administrator to assign a reputation to the object. For example, if the object is a utility being developed within enterprise 912, the administrator may greenlight the object. On the other hand, if the administrator does not recognize the object, or believes it to be malicious, she may redlight the object. In yet another example, the administrator may not recognize the object, and may request SSP 904 to subject the object to analysis, including, for example, static or dynamic analysis, analysis by a computer vision system, analysis by another neural network, or other analysis. In some cases, the analysis may be assigned a priority. For example, the priority may be influenced by whether the object was identified by ML engine 928, the score of the object, including its $R^2$ distance from similar objects, the nature of the closest objects, or whether analysis was manually requested, for example, by an enterprise user. Furthermore, in the case of a manual request, the priority could be influenced by the reputation of the enterprise itself (e.g., whether the enterprise has a reputation for making valid requests), or nontechnical factors such as whether the enterprise subscribes to a premium or priority service.

Once the object has been analyzed, it may be assigned a reputation by ML engine 928, and that reputation may be updated in enterprise model 924. As ML engine 928 encounters similar objects, they may be assigned a similar reputation, based for example on their $R^2$ distance from the original object.

Returning to the example of an actively developed utility within enterprise 912, when enterprise console 932 presents the object to the enterprise security administrator, she may greenlight the object, indicating that the object is known to be safe within enterprise 912. Note, however, that this applies only to enterprise model 924, which is specific to enterprise 912. If the object were to escape enterprise 912 and show up in another enterprise, it would not receive the greenlight reputation assigned by enterprise console 932.

As active development on the object continues, the object may change over time. Advantageously, the neural network of the present specification is able to identify the object as being similar, even if it is not identical to the previous version. For example, as developers check in their changes on a daily basis, small portions of the object may change, which changes its checksum and other features that may frustrate a system that relies on identical matching. However, the teachings of the present specification provide an ML engine 928 that can analyze the features of the object, and determine that it has a relatively small $R^2$ distance from the object that was previously greenlit, or manually analyzed. This means that performing additional static or dynamic analysis on the slightly changed object may be of a relatively low priority. However, the object may be presented in some embodiments to enterprise console 932 as a target object 930, once again. If the security administrator again greenlights the object, then this event is also used to update enterprise model 924. Depending on the sensitivity of the model, with enough greenlights, ML engine 928 may cease presenting newer versions of the object to enterprise console 932 as target objects 930.

However, over time, the object may change substantially from the version that was initially greenlit. Furthermore, if there is a major code refactoring, then even from one day to the next, the object may change substantially. At some point, the $R^2$ distance between the newly-encountered object and the version of the object that was greenlit by the security administrator is sufficiently large that there is no longer high confidence that the object is safe. At that point, the object may once again be presented to the security administrator via enterprise console 932. The administrator's action in response to this, such as green-lighting, yellow-lighting, or red-lighting, may be used to update enterprise model 924.

Figure 10:
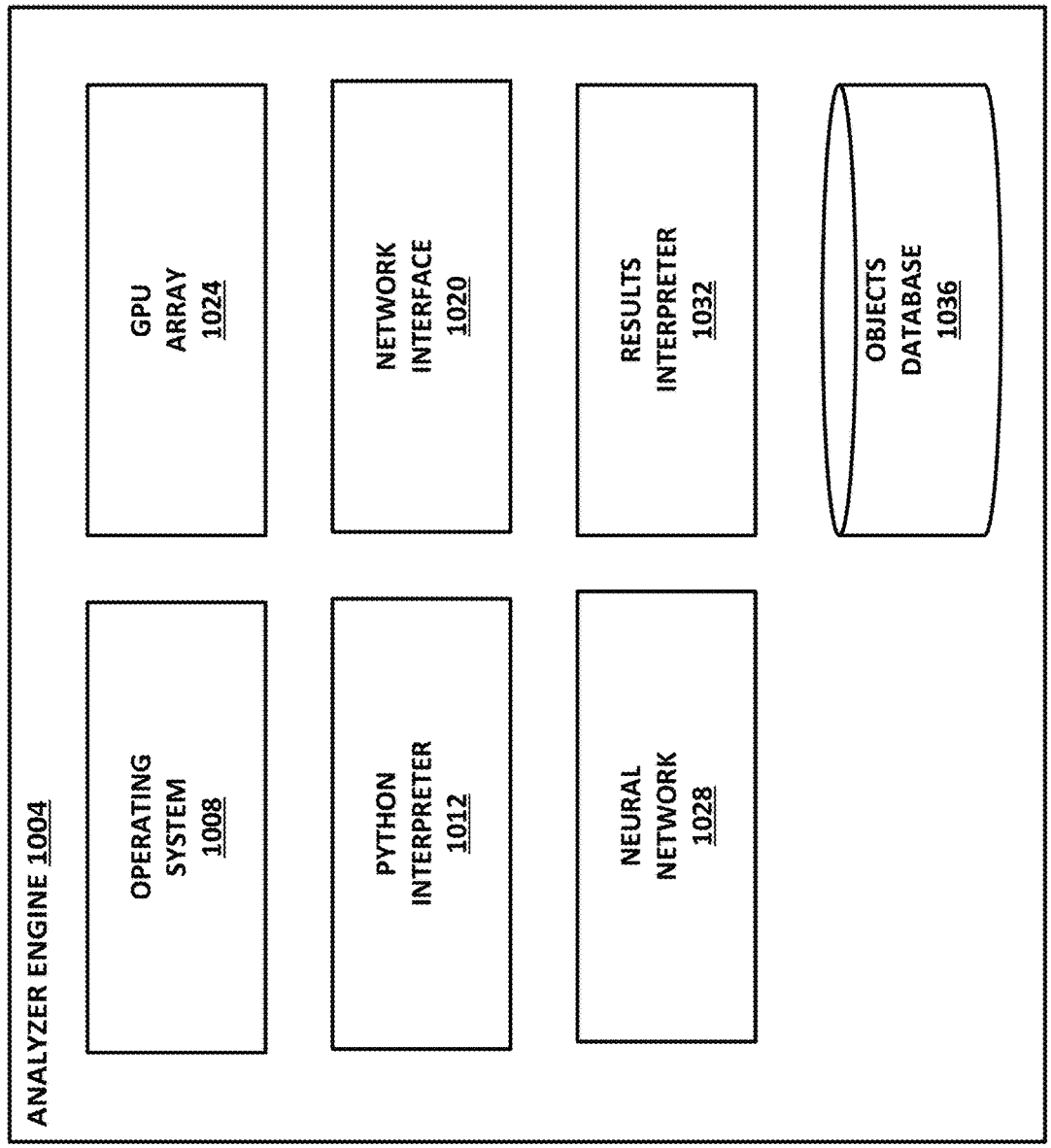
FIG. 10 is a block diagram of selected elements of an analyzer engine.

FIG. 10 is a block diagram of an analyzer engine 1004. Analyzer engine 1004 may be configured to provide analysis services, such as via a neural network. FIG. 10 is an example of a machine learning engine which could be used to implement, for example, ML engine 928 of FIG. 9.

Note that analyzer engine 1004 is illustrated here as a single modular object, but in some cases, different aspects of analyzer engine 1004 could be provided by separate hardware, or by separate guests (e.g., virtual machines or containers) on a hardware system.

Analyzer engine 1004 includes an operating system 1008. Commonly, operating system 1008 is a Linux operating system, although other operating systems, such as Microsoft Windows, Mac OS X, or similar could be used. Analyzer engine 1004 also includes a Python interpreter 1012, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

Graphics processing unit (GPU) array 1024 may include an array of graphics processing units that may be used to carry out the neural network functions of neural network 1028. Note that GPU arrays are a popular choice for this kind of processing, but neural networks can also be implemented in central processing units (CPUs), or in application-specific integrated circuits (ASICs) or field-programmable gate arrays (FPGAs) that are specially designed to implement the neural network.

Neural network 1028 includes the actual code for carrying out the neural network, and as mentioned above, is commonly programmed in Python.

Results interpreter 1032 may include logic separate from the neural network functions that can be used to operate on the outputs of the neural network to assign the object for particular classification, perform additional analysis, and/or provide a recommended remedial action.

Objects database 1036 may include a database of known malware objects and their classifications. Neural network 1028 may initially be trained on objects within objects database 1036, and as new objects are identified, objects database 1036 may be updated with the results of additional neural network analysis.

Once final results have been obtained, the results may be sent to an appropriate destination via network interface 1020.

Figure 11:
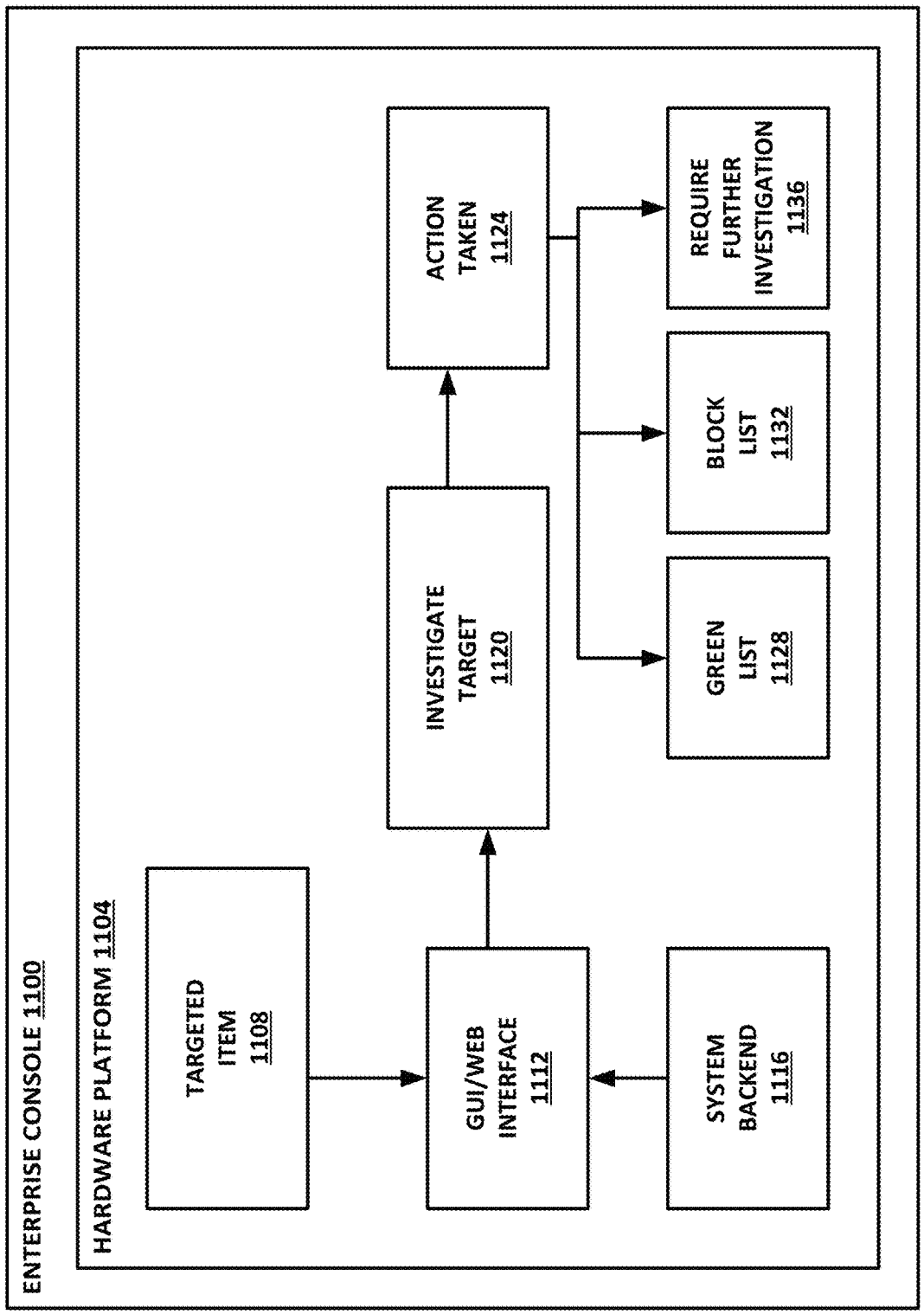
FIG. 11 is a block diagram of selected elements of an enterprise console.

FIG. 11 is a block diagram of selected elements of an enterprise console 1100. Enterprise console 1100 may be a software module that runs on a device, a virtual machine, a container, a snap or other package manager, or in any other hardware and/or software architecture.

Enterprise console 1100 includes a hardware platform 1104. Note that hardware platform 1104 could include a guest infrastructure, such as for virtualization and/or containerization.

Hardware platform 1104 receives a targeted item 1108. This may be analogous to target object 930 of FIG. 9. The targeted item is an item that is presented for inspection by a security administrator. Targeted item 1108 is provided to a GUI or web interface 1112. Note that GUI and web interfaces are provided as illustrative and nonlimiting examples of interfaces that may be used. Though such interfaces are common, a command line or textual user interface (TUI), a log file, or any other appropriate interface could be used.

Particularly in the case of a web interface, the web interface could be provided locally on hardware platform 1104, or could be provided remotely, such as on a web server within an enterprise, or even by a CSP or SSP as illustrated in FIG. 9.

One feature of GUI/web interface 1112 is a display of one or more targeted items for the security administrator to review and react to. This could be a selection of newly identified items that do not yet have a reliable reputation for the enterprise, for which feedback from a security administrator for the enterprise may be useful.

In the case of a single administrator, this may be referred to as "user-sourcing a reputation." In other words, a single administrator provides feedback on the reputation of objects. In other cases, multiple administrators, either within the same enterprise or across different enterprises, may be presented with the same object. This may be referred to as "crowdsourcing." In crowdsourcing, the individual inputs from different administrators may be aggregated, and a reputation may be derived based on the aggregate inputs. This could include, in some cases, assigning a reputation to the individual user or enterprise. For example, if an enterprise has twelve security administrators who are all shown an object, and eleven of them mark it as benign while one marks it as suspicious, the one suspicious marking may be considered an outlier and may be discarded in favor of the eleven benign markings. On the other hand, if the one administrator who marked the object as malicious has a high reputation, such as for experience and perceptiveness, then that one administrator may have identified an issue with the object that the others did not. In that case, the one outlier's high reputation for perceptiveness may trump the other eleven administrators. Also hosted on hardware platform 1104 is a system backend 1116. This includes the actual antivirus, anti-malware, or other security software that may run on the system or the enterprise. This could be hosted on the same hardware platform 1104 as the GUI or web interface 1112, or on a separate hardware platform. If on the same hardware platform, either or both of these could be run under a guest infrastructure such as virtualization or containerization.

Based on the action taken within GUI/web interface 1112, there may be a directive 1120 to investigate the target. This could include an indication that the object is malicious or unknown, and that it requires further review. As discussed above, via GUI/web interface 1112, a system administrator may take an action, such as green-lighting, red-lighting, and/or yellow-lighting the target. This is collected as action taken 1124.

Depending on the action taken, the enterprise-specific machine learning model may be updated according to the action taken. This could include greenlisting the object 1128, blocklisting the object 1132, or requiring further investigation 1136.

Figure 12:
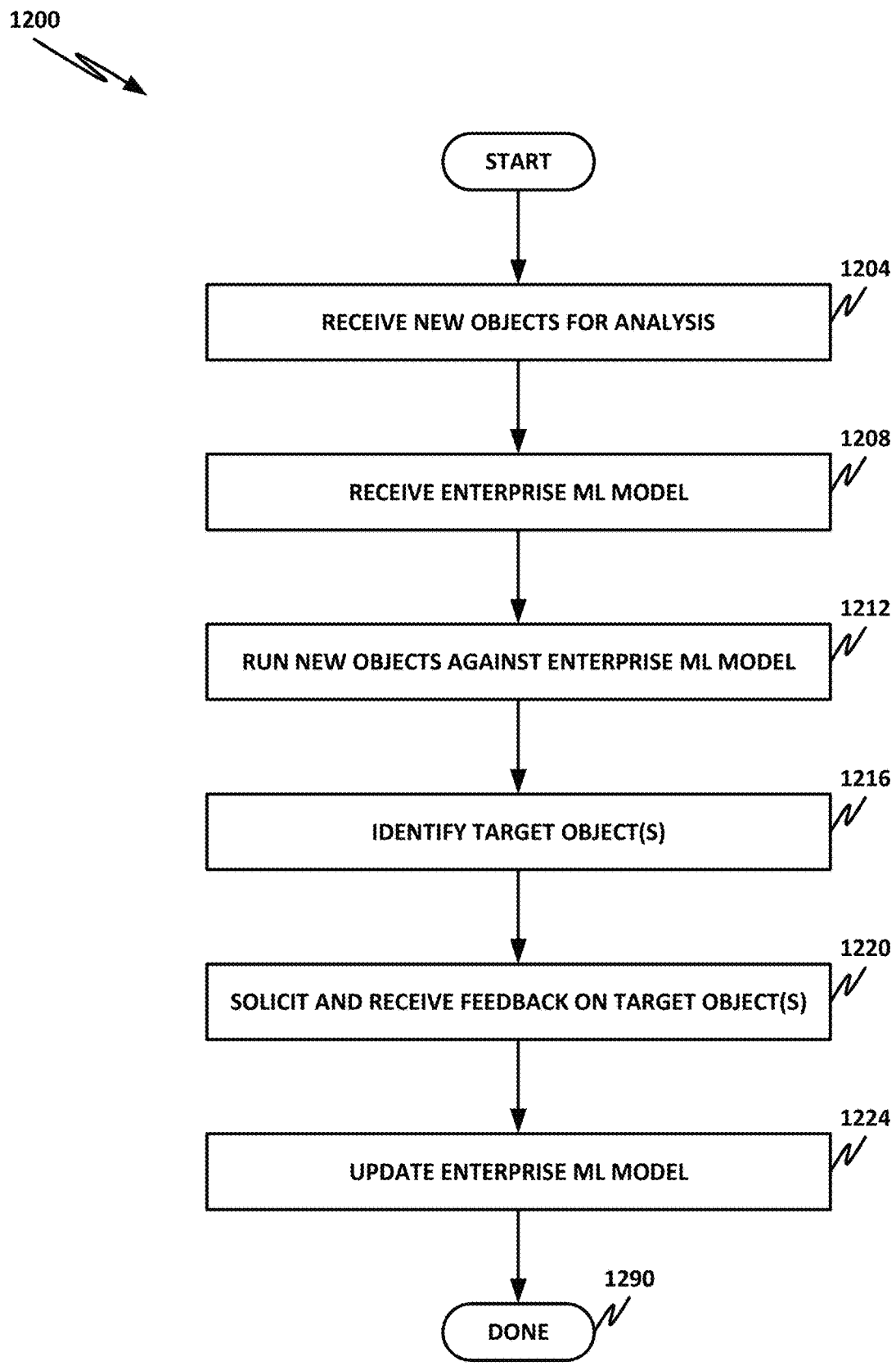
FIG. 12 is a flowchart of a method of providing security within an enterprise.

FIG. 12 is a flowchart of a method 1200 of providing security within an enterprise. Starting in block 1204, the system receives a new object for analysis. This may be an object that has not been previously identified, at least in its identical form in the enterprise, and therefore requires a reputation.

In block 1208, a machine learning system receives an enterprise-specific machine learning model to operate on. This includes, for example, an enterprise-specific training data set, and/or enterprise-specific updates to a generic training set.

In block 1212, the machine learning system runs the new object against the enterprise-specific machine learning model. As described herein, this may include computing an $R^2$ distance between the object and other objects within the model.

In block 1216, the system identifies one or more target objects that may require, for example, further analysis, or for which it is desirable to receive a manual reputation input.

In block 1220, the machine learning system solicits feedback, for example, from an enterprise console. The system may then receive, from the enterprise console or from another source, feedback on the target object or objects.

In block 1224, according to the feedback received, and according to any action taken responsive to the feedback (e.g., performing additional analysis of the object upon request from the user), the enterprise-specific machine learning model may be updated. This will include an updated reputation for the object. This reputation may then be integrated into the model, and reputations for new objects may then be derived, for example, by computing the $R^2$ distance between the new object and the object that now has a known or reliable reputation.

In block 1290, the method is done.

Figure 13:
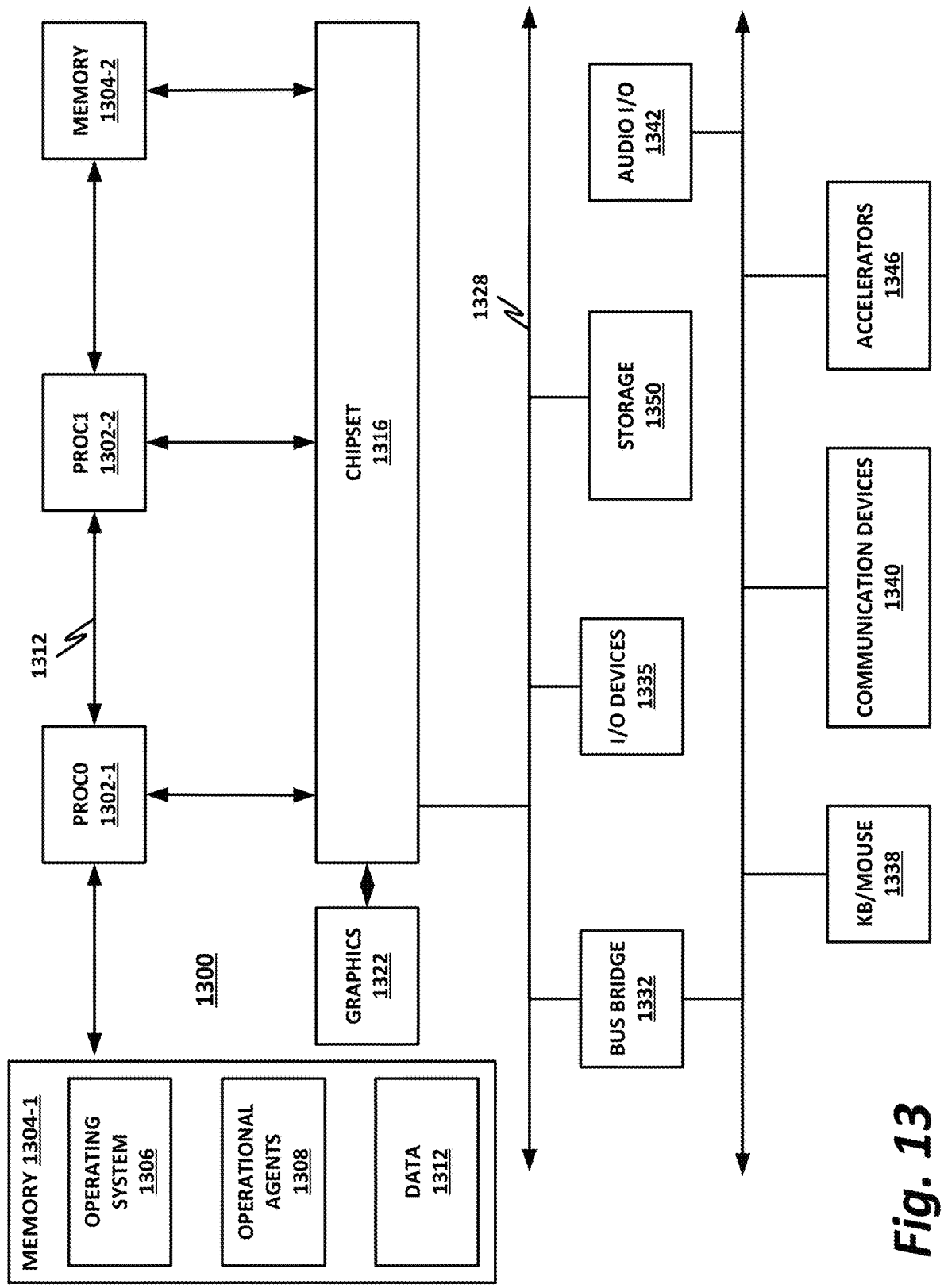
FIG. 13 is a block diagram of selected elements of a hardware platform.

FIG. 13 is a block diagram of a hardware platform 1300. In at least some embodiments, hardware platform 1300 may be configured or adapted to provide user-sourced object reputations, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1300, even though they may be scattered across a data center, or even located in different data centers.

Hardware platform 1300 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1300 is arranged in a point-to-point (PtP) configuration. This PtP configuration is popular for personal computer (PC) and server-type devices, although it is not so limited, and any other bus type may be used.

Hardware platform 1300 is an example of a platform that may be used to implement embodiments of the teachings of this specification. For example, instructions could be stored in storage 1350. Instructions could also be transmitted to the hardware platform in an ethereal form, such as via a network interface, or retrieved from another source via any suitable interconnect. Once received (from any source), the instructions may be loaded into memory 1304, and may then be executed by one or more processor 1302 to provide elements such as an operating system 1306, operational agents 1308, or data 1312.

Figure 15:
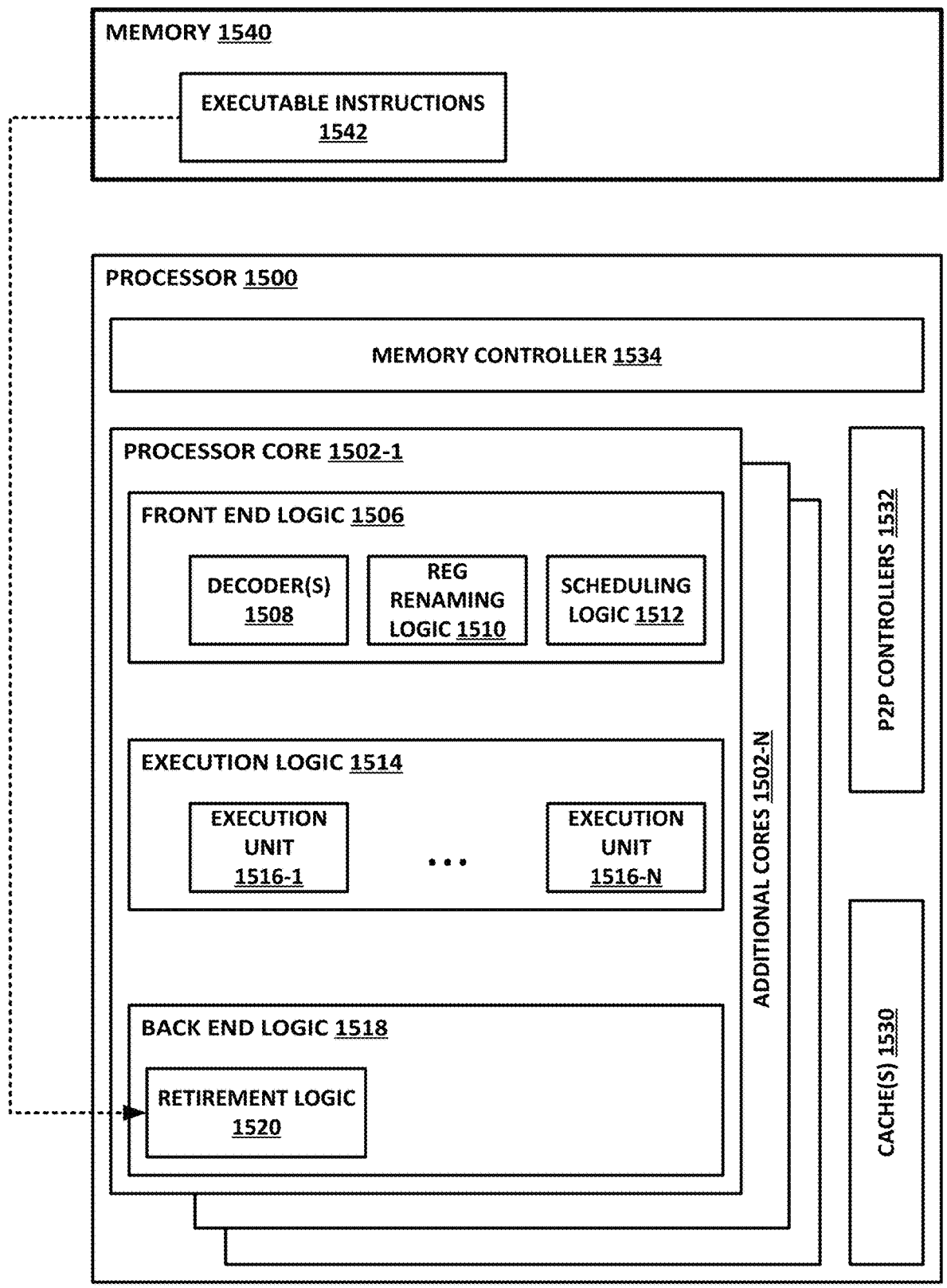
FIG. 15 is a block diagram of selected elements of a processor.

Hardware platform 1300 may include several processors 1302. For simplicity and clarity, only processors PROC0 1302-1 and PROC1 1302-2 are shown. Additional processors (such as 2, 4, 8, 16, 24, 32, 64, or 128 processors) may be provided as necessary, while in other embodiments, only one processor may be provided. Details of processors 1302 are not illustrated in this FIGURE, but one embodiment is illustrated in FIG. 15. Processors may have any number of cores, such as 1, 2, 4, 8, 16, 24, 32, 64, or 128 cores.

Processors 1302 may be any type of processor and may communicatively couple to chipset 1316 via, for example, PtP interfaces. Chipset 1316 may also exchange data with other elements, such as a high performance graphics adapter 1322. In alternative embodiments, any or all of the PtP links illustrated in FIG. 13 could be implemented as any type of bus, or other configuration rather than a PtP link. In various embodiments, chipset 1316 may reside on the same die or package as a processor 1302 or on one or more different dies or packages. Each chipset may support any suitable number of processors 1302. A chipset 1316 (which may be a chipset, uncore, Northbridge, Southbridge, or other suitable logic and circuitry) may also include one or more controllers to couple other components to one or more CPUs.

Two memories, 1304-1 and 1304-2 are shown, connected to PROC0 1302-1 and PROC1 1302-2, respectively. As an example, each processor is shown connected to its memory in a direct memory access (DMA) configuration, though other memory architectures are possible, including ones in which memory 1304 communicates with a processor 1302 via a bus. For example, some memories may be connected via a system bus, or in a data center, memory may be accessible in a remote DMA (RDMA) configuration.

Memory 1304 may include any form of volatile or non-volatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1304 may be used for short, medium, and/or long-term storage. Memory 1304 may store any suitable data or information utilized by platform logic. In some embodiments, memory 1304 may also comprise storage for instructions that may be executed by the cores of processors 1302 or other processing elements (e.g., logic resident on chipsets 1316) to provide functionality.

In certain embodiments, memory 1304 may comprise a relatively low-latency volatile main memory, while storage 1350 may comprise a relatively higher-latency nonvolatile memory. However, memory 1304 and storage 1350 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1304 and storage 1350, for example, in a single physical memory device, and in other cases, memory 1304 and/or storage 1350 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1322 may be configured to provide a human-readable visual output, such as a command line interface (CLI) or graphical desktop such as Microsoft Windows, Apple OSX desktop, or a Unix/Linux X Window System-based desktop. Graphics adapter 1322 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1322 may include a hardware graphics card, which may have its own memory and its own GPU.

Chipset 1316 may be in communication with a bus 1328 via an interface circuit. Bus 1328 may have one or more devices that communicate over it, such as a bus bridge 1332, I/O devices 1335, accelerators 1346, communication devices 1340, and a keyboard and/or mouse 1338, by way of nonlimiting example. In general terms, the elements of hardware platform 1300 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1340 can broadly include any communication not covered by a network interface and the various I/O devices described herein. This may include, for example, various universal serial bus (USB), FireWire, Lightning, or other serial or parallel devices that provide communications.

I/O Devices 1335 may be configured to interface with any auxiliary device that connects to hardware platform 1300 but that is not necessarily a part of the core architecture of hardware platform 1300. A peripheral may be operable to provide extended functionality to hardware platform 1300, and may or may not be wholly dependent on hardware platform 1300. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1342 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1332 may be in communication with other devices such as a keyboard/mouse 1338 (or other input devices such as a touch screen, trackball, etc.), communication devices 1340 (such as modems, network interface devices, peripheral interfaces such as PCI or PCIe, or other types of communication devices that may communicate through a network), audio I/O 1342, and/or accelerators 1346. In alternative embodiments, any portions of the bus architectures could be implemented with one or more PtP links.

Operating system 1306 may be, for example, Microsoft Windows, Linux, UNIX, Mac OS X, iOS, MS-DOS, or an embedded or real-time operating system (including embedded or real-time flavors of the foregoing). In some embodiments, a hardware platform 1300 may function as a host platform for one or more guest systems that invoke application (e.g., operational agents 1308).

Operational agents 1308 may include one or more computing engines that may include one or more non-transitory computer-readable mediums having stored thereon executable instructions operable to instruct a processor to provide operational functions. At an appropriate time, such as upon booting hardware platform 1300 or upon a command from operating system 1306 or a user or security administrator, a processor 1302 may retrieve a copy of the operational agent (or software portions thereof) from storage 1350 and load it into memory 1304. Processor 1302 may then iteratively execute the instructions of operational agents 1308 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, an FPGA programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1300 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1300 may be virtualized, in particular the processor(s) and memory. For example, a virtualized environment may run on OS 1306, or OS 1306 could be replaced with a hypervisor or virtual machine manager. In this configuration, a virtual machine running on hardware platform 1300 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 13 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 14. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, FPGAs, and other semiconductor chips.

Figure 14:
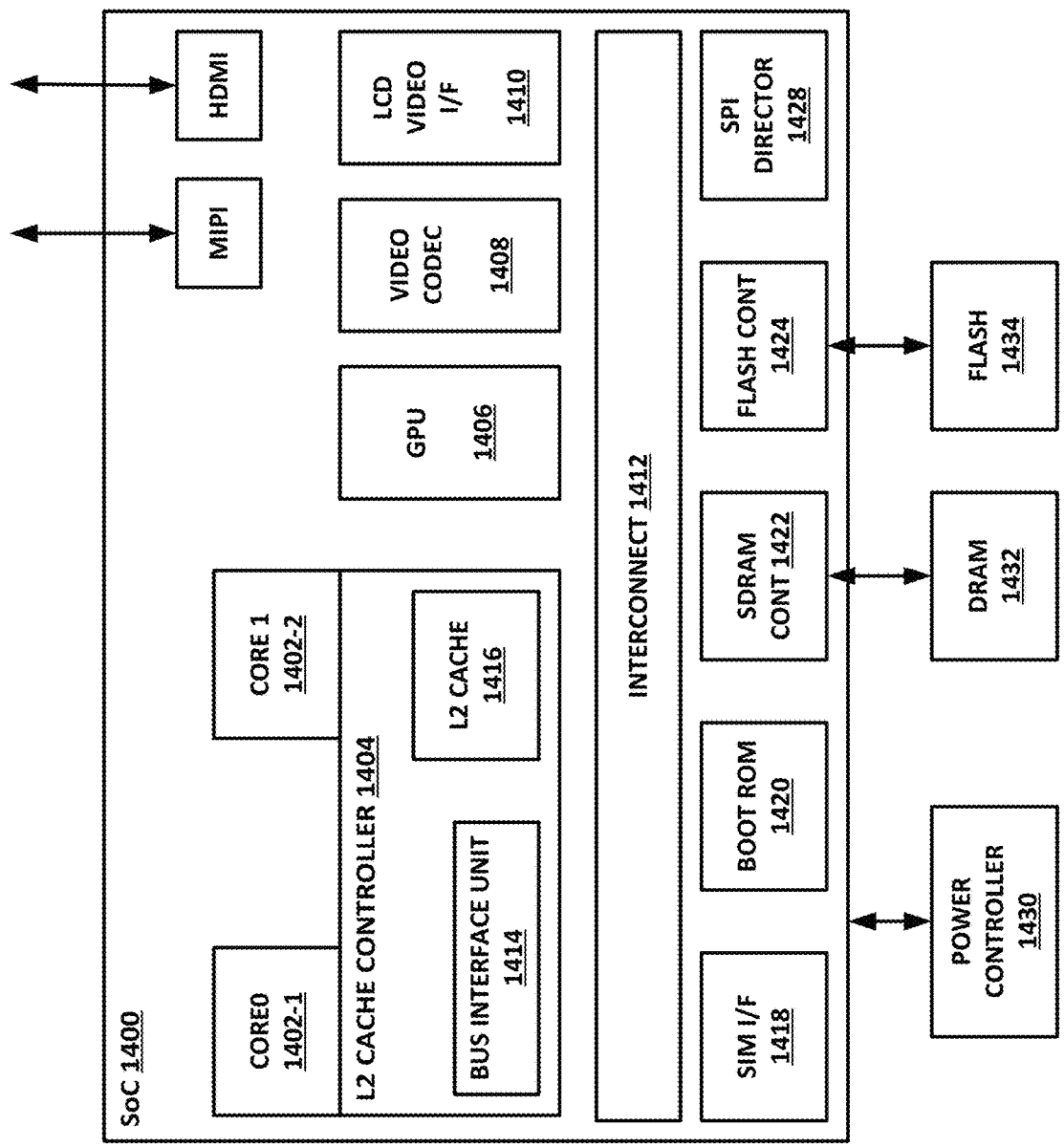
FIG. 14 is a block diagram of selected elements of a system-on-a-chip (SoC).

FIG. 14 is a block illustrating selected elements of an example SoC 1400. In at least some embodiments, SoC 1400 may be configured or adapted to provide user-sourced object reputations, according to the teachings of the present specification.

At least some of the teachings of the present specification may be embodied on an SoC 1400, or may be paired with an SoC 1400. SoC 1400 may include, or may be paired with, an advanced reduced instruction set computer machine (ARM) component. For example, SoC 1400 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 1400 could also be integrated into, for example, a PC, server, video processing components, laptop computer, notebook computer, netbook, or touch-enabled device.

As with hardware platform 1300 above, SoC 1400 may include multiple cores 1402-1 and 1402-2. In this illustrative example, SoC 1400 also includes an L2 cache control 1404, a GPU 1406, a video codec 1408, a liquid crystal display (LCD) I/F 1410 and an interconnect 1412. L2 cache control 1404 can include a bus interface unit 1414, a L2 cache 1416. Liquid crystal display (LCD) I/F 1410 may be associated with mobile industry processor interface (MIPI)/HDMI links that couple to an LCD.

SoC 1400 may also include a subscriber identity module (SIM) I/F 1418, a boot ROM 1420, a synchronous dynamic random access memory (SDRAM) controller 1422, a flash controller 1424, a serial peripheral interface (SPI) director 1428, a suitable power control 1430, a dynamic RAM (DRAM) 1432, and flash 1434. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1400 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 15 is a block diagram illustrating selected elements of a processor 1500. In at least some embodiments, processor 1500 may be configured or adapted to provide user-sourced object reputations, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1500 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and nonvolatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1500 includes one or more processor cores 1502, including core 1502-1-1502-N. Cores 1502 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1500 may include at least one shared cache 1530, which may be treated logically as part of memory 1540. Memory 1540 may include executable instructions 1542, as illustrated. Caches 1530 may be filled according to known caching techniques, and may store instructions and/or data that may be used by one or more components of processor 1500.

Processor 1500 may include an integrated memory controller (MC) 1534, to communicate with memory 1540. Memory controller 1534 may include logic and circuitry to interface with memory 1540, and may also include a cache controller to handle filling and evicting instructions and data to and from cache 1530.

By way of example, each core 1502 may include front-end logic 1506, execution logic 1514, and backend logic 1518.

In the illustrated embodiment, front-end logic 1506 includes an instruction decoder or decoders 1508, register renaming logic 1510, and scheduling logic 1512. Decoder 1508 may decode instructions received. Register renaming logic 1510 may provide register renaming, for example to facilitate pipelining. Scheduling logic 1512 may schedule instruction execution, and may provide out-of-order (OOO) execution. Front-end logic 1506 may fetch incoming instructions, perform various processing (e.g., caching, decoding, branch predicting, etc.), and pass instructions to execution logic 1514.

Execution logic 1514 includes one or more execution units 1516-1-1516-N. Execution units 1516 may include hardware instructions and microcode to carry out the provided instructions.

Backend logic 1518 includes retirement logic 1520. Core 1502 may provide for speculative execution of instructions, branch prediction, and similar. Retirement logic 1520 may be configured to determine which predicted instructions were actually needed by the program flow.

Processor 1500 may also include a PtP controller 1532, which enables connection to an uncore, chipset, Northbridge, Southbridge, or bus, by way of example.

Figure 16:
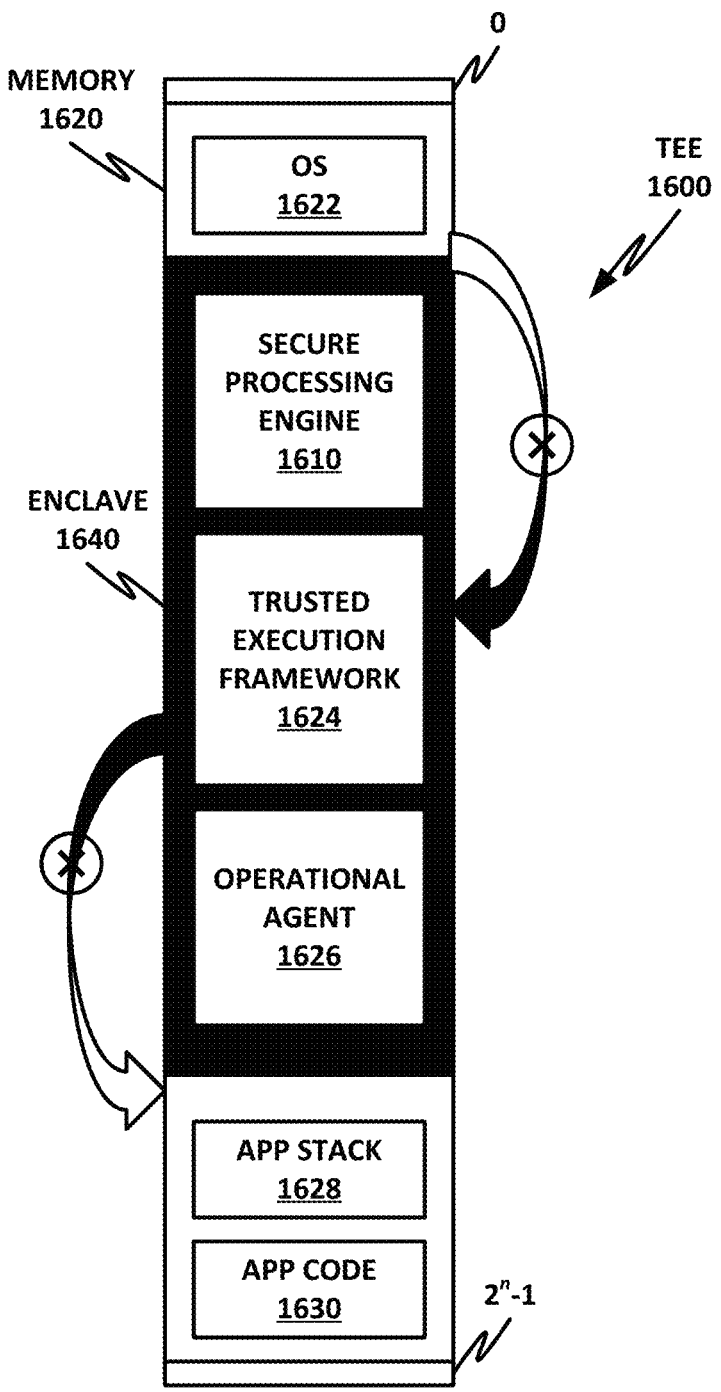
FIG. 16 is a block diagram of selected elements of a trusted execution environment (TEE).

FIG. 16 is a block diagram of a trusted execution environment (TEE) 1600. A TEE such as the one disclosed in FIG. 16 could be used in conjunction with embodiments of this disclosure. For example, a TEE could be used to enable signed and/or encrypted of information between the enterprise console and the security services provider.

In the example of FIG. 16, memory 1620 is addressable by n-bits, ranging in address from 0 to $2^n-1$ (note, however, that in many cases, the size of the address space may far exceed the actual memory available). Within memory 1620 is an OS 1622, enclave 1640, application stack 1620, and application code 1630.

In this example, enclave 1640 is a specially-designated portion of memory 1620 that cannot be entered into or exited from except via special instructions, such as Intel Software Guard Extensions (SGX) or similar. Enclave 1640 is provided as an example of a secure environment which, in conjunction with a secure processing engine 1610, forms a TEE 1600 on a hardware platform such as platform 1300 of FIG. 13. A TEE 1600 is a combination of hardware, software, and/or memory allocation that provides the ability to securely execute instructions without interference from outside processes, in a verifiable way. By way of example, TEE 1600 may include memory enclave 1640 or some other protected memory area, and a secure processing engine 1610, which includes hardware, software, and instructions for accessing and operating on enclave 1640. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1610 may be a user-mode application that operates via trusted execution framework 1624 within enclave 1640. TEE 1600 may also conceptually include processor instructions that secure processing engine 1610 and trusted execution framework 1624 require to operate within enclave 1640.

Secure processing engine 1610 and trusted execution framework 1624 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1622 may be excluded from TCB, in addition to the regular application stack 1628 and application code 1630.

In certain systems, computing devices equipped with Intel SGX or equivalent instructions may be capable of providing an enclave 1640. It should be noted, however, that many other examples of TEEs are available, and TEE 1600 is provided only as one example thereof. Other secure environments may include, by way of nonlimiting example, a virtual machine, sandbox, testbed, test machine, or other similar device or method for providing a TEE 1600.

In an example, enclave 1640 provides a protected memory area that cannot be accessed or manipulated by ordinary computer instructions. Enclave 1640 is described with particular reference to an Intel SGX enclave by way of example, but it is intended that enclave 1640 encompass any secure processing area with suitable properties, regardless of whether it is called an "enclave."

One feature of an enclave is that once an enclave region 1640 of memory 1620 is defined, as illustrated, a program pointer cannot enter or exit enclave 1640 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1640.

Thus, once enclave 1640 is defined in memory 1304, a program executing within enclave 1640 may be safely verified to not operate outside of its bounds. This security feature means that secure processing engine 1610 is verifiably local to enclave 1640. Thus, when an untrusted packet provides its content to be rendered with trusted execution framework 1624 of enclave 1640, the result of the rendering is verified as secure.

Enclave 1640 may also digitally sign its output, which provides a verifiable means of ensuring that content has not been tampered with or modified since being rendered by secure processing engine 1610. A digital signature provided by enclave 1640 is unique to enclave 1640 and is unique to the hardware of the device hosting enclave 1640.

Figure 17:
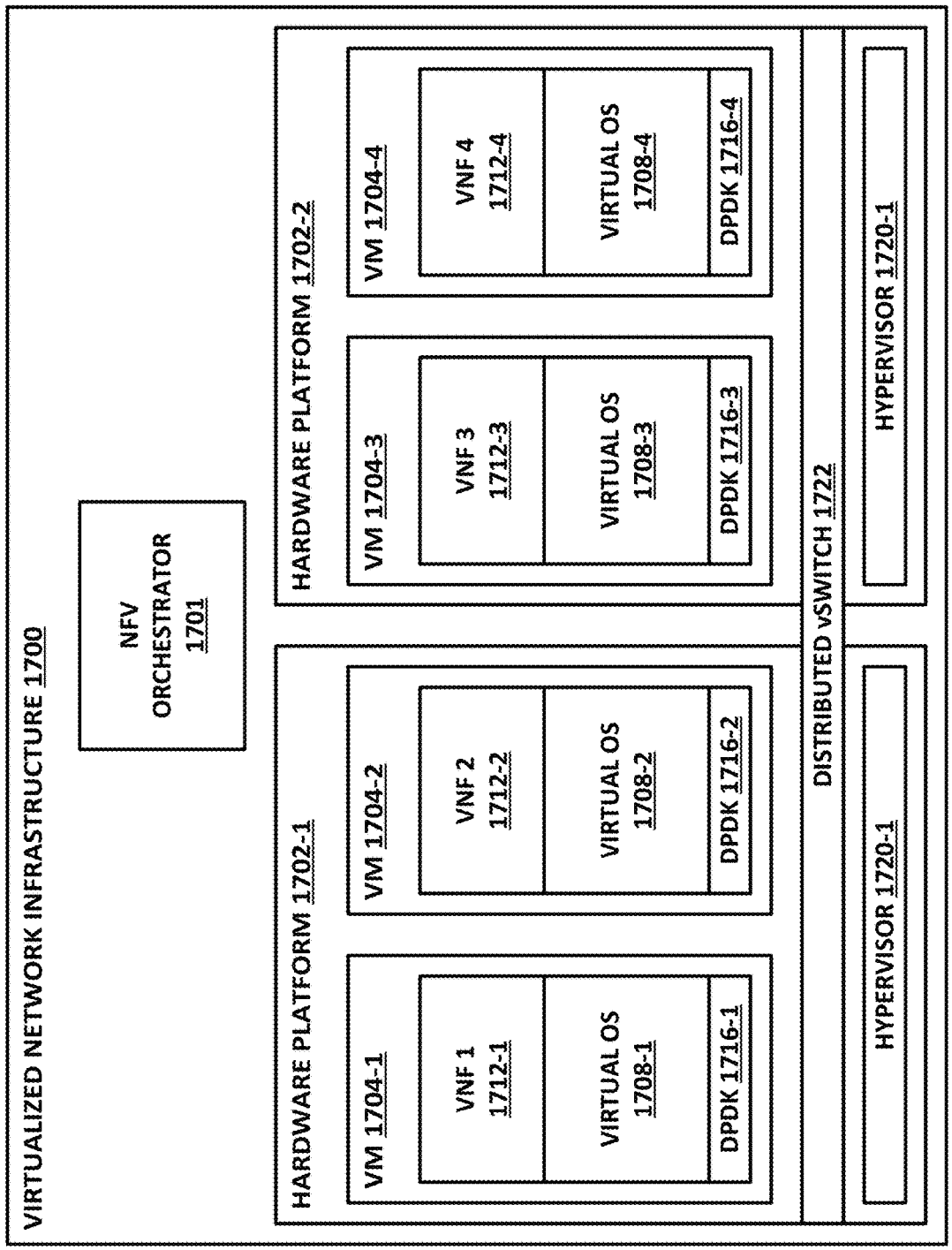
FIG. 17 is a block diagram of selected elements of a network function virtualization (NFV) infrastructure.

FIG. 17 is a block diagram of a network function virtualization (NFV) infrastructure 1700. A virtualization infrastructure such as the one illustrated in FIG. 17 could be used in conjunction with embodiments of this disclosure. For example, any one of enterprise console 932 of FIG. 9, any of the logical blocks of CSP 908, and/or any of the logical blocks of SSP 904 could be provided as virtual machines.

NFV is an aspect of network virtualization that is generally considered distinct from, but that can still interoperate with, SDN. For example, VNFs may operate within the data plane of an SDN deployment. NFV was originally envisioned as a method for providing reduced capital expenditure (Capex) and operating expenses (Opex) for telecommunication services. One feature of NFV is replacing proprietary, special purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1700. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 17, an NFV orchestrator 1701 manages a number of the VNFs 1712 running on an NFVI 1700. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1701 a valuable system resource. Note that NFV orchestrator 1701 may provide a browser-based or graphical configuration interface, and in some embodiments may be integrated with SDN orchestration functions.

Note that NFV orchestrator 1701 itself may be virtualized (rather than a special purpose hardware appliance). NFV orchestrator 1701 may be integrated within an existing SDN system, wherein an operations support system (OSS) manages the SDN. This may interact with cloud resource management systems (e.g., OpenStack) to provide NFV orchestration. An NFVI 1700 may include the hardware, software, and other infrastructure to enable VNFs to run. This may include a hardware platform 1702 on which one or more VMs 1704 may run. For example, hardware platform 1702-1 in this example runs VMs 1704-1 and 1704-2. Hardware platform 1702-2 runs VMs 1704-3 and 1704-4. Each hardware platform may include a hypervisor 1720, virtual machine manager (VMM), or similar function, which may include and run on a native (bare metal) operating system, which may be minimal so as to consume very few resources.

Hardware platforms 1702 may be or comprise a rack or several racks of blade or slot servers (including, e.g., processors, memory, and storage), one or more data centers, other hardware resources distributed across one or more geographic locations, hardware switches, or network interfaces. An NFVI 1700 may also include the software architecture that enables hypervisors to run and be managed by NFV orchestrator 1701.

Running on NFVI 1700 are a number of VMs 1704, each of which in this example is a VNF providing a virtual service appliance. Each VM 1704 in this example includes an instance of the Data Plane Development Kit (DPDK), a virtual operating system 1708, and an application providing the VNF 1712.

Virtualized network functions could include, as nonlimiting and illustrative examples, firewalls, intrusion detection systems, load balancers, routers, session border controllers, DPI services, network address translation (NAT) modules, or call security association.

The illustration of FIG. 17 shows that a number of VNFs 1704 have been provisioned and exist within NFVI 1700. This FIGURE does not necessarily illustrate any relationship between the VNFs and the larger network, or the packet flows that NFVI 1700 may employ.

The illustrated DPDK instances 1716 provide a set of highly-optimized libraries for communicating across a virtual switch (vSwitch) 1722. Like VMs 1704, vSwitch 1722 is provisioned and allocated by a hypervisor 1720. The hypervisor uses a network interface to connect the hardware platform to the data center fabric (e.g., an HFI). This HFI may be shared by all VMs 1704 running on a hardware platform 1702. Thus, a vSwitch may be allocated to switch traffic between VMs 1704. The vSwitch may be a pure software vSwitch (e.g., a shared memory vSwitch), which may be optimized so that data are not moved between memory locations, but rather, the data may stay in one place, and pointers may be passed between VMs 1704 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1722 is illustrated, wherein vSwitch 1722 is shared between two or more physical hardware platforms 1702.

Figure 18:
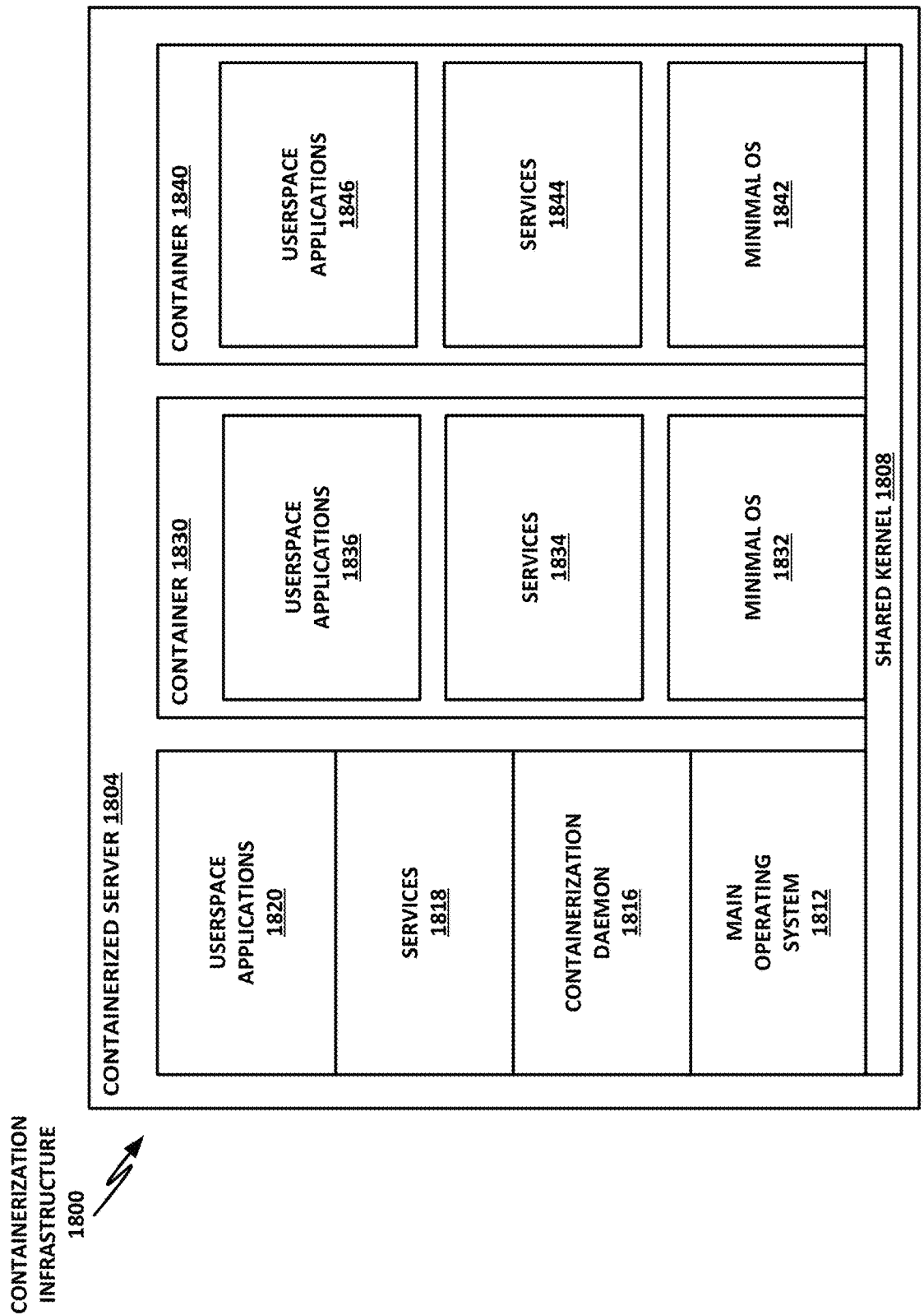
FIG. 18 is a block diagram of selected elements of a containerization infrastructure.

FIG. 18 is a block diagram of selected elements of a containerization infrastructure 1800. A containerization infrastructure such as the one illustrated in FIG. 18 could be used in conjunction with embodiments of this disclosure. For example, any one of enterprise console 932 of FIG. 9, any of the logical blocks of CSP 908, and/or any of the logical blocks of SSP 904 could be provided as containers. Like virtualization, containerization is a popular form of providing a guest infrastructure.

Containerization infrastructure 1800 runs on a hardware platform such as containerized server 1804. Containerized server 1804 may provide a number of processors, memory, one or more network interfaces, accelerators, and/or other hardware resources.

Running on containerized server 1804 is a shared kernel 1808. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1808 is main operating system 1812. Commonly, main operating system 1812 is a Unix or Linux-based operating system, although containerization infrastructure is also available for other types of systems, including Microsoft Windows systems and Macintosh systems. Running on top of main operating system 1812 is a containerization layer 1816. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1812 may also include a number of services 1818, which provide services and interprocess communication to userspace applications 1820.

Services 1818 and userspace applications 1820 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1812, they inherit the same file and resource access permissions as those provided by shared kernel 1808. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1804, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1804).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1804 hosts two containers, namely container 1830 and container 1840.

Container 1830 may include a minimal operating system 1832 that runs on top of shared kernel 1808. Note that a minimal operating system is provided as an illustrative example, and is not mandatory. In fact, container 1830 may perform as full an operating system as is necessary or desirable. Minimal operating system 1832 is used here as an example simply to illustrate that in common practice, the minimal operating system necessary to support the function of the container (which in common practice, is a single or monolithic function) is provided.

On top of minimal operating system 1832, container 1830 may provide one or more services 1834. Finally, on top of services 1834, container 1830 may also provide a number of userspace applications 1836, as necessary.

Container 1840 may include a minimal operating system 1842 that runs on top of shared kernel 1808. Note that a minimal operating system is provided as an illustrative example, and is not mandatory. In fact, container 1840 may perform as full an operating system as is necessary or desirable. Minimal operating system 1842 is used here as an example simply to illustrate that in common practice, the minimal operating system necessary to support the function of the container (which in common practice, is a single or monolithic function) is provided.

On top of minimal operating system 1842, container 1840 may provide one or more services 1844. Finally, on top of services 1844, container 1840 may also provide a number of userspace applications 1846, as necessary.

Using containerization layer 1816, containerized server 1804 may run a number of discrete containers, each one providing the minimal operating system and/or services necessary to provide a particular function. For example, containerized server 1804 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 19:
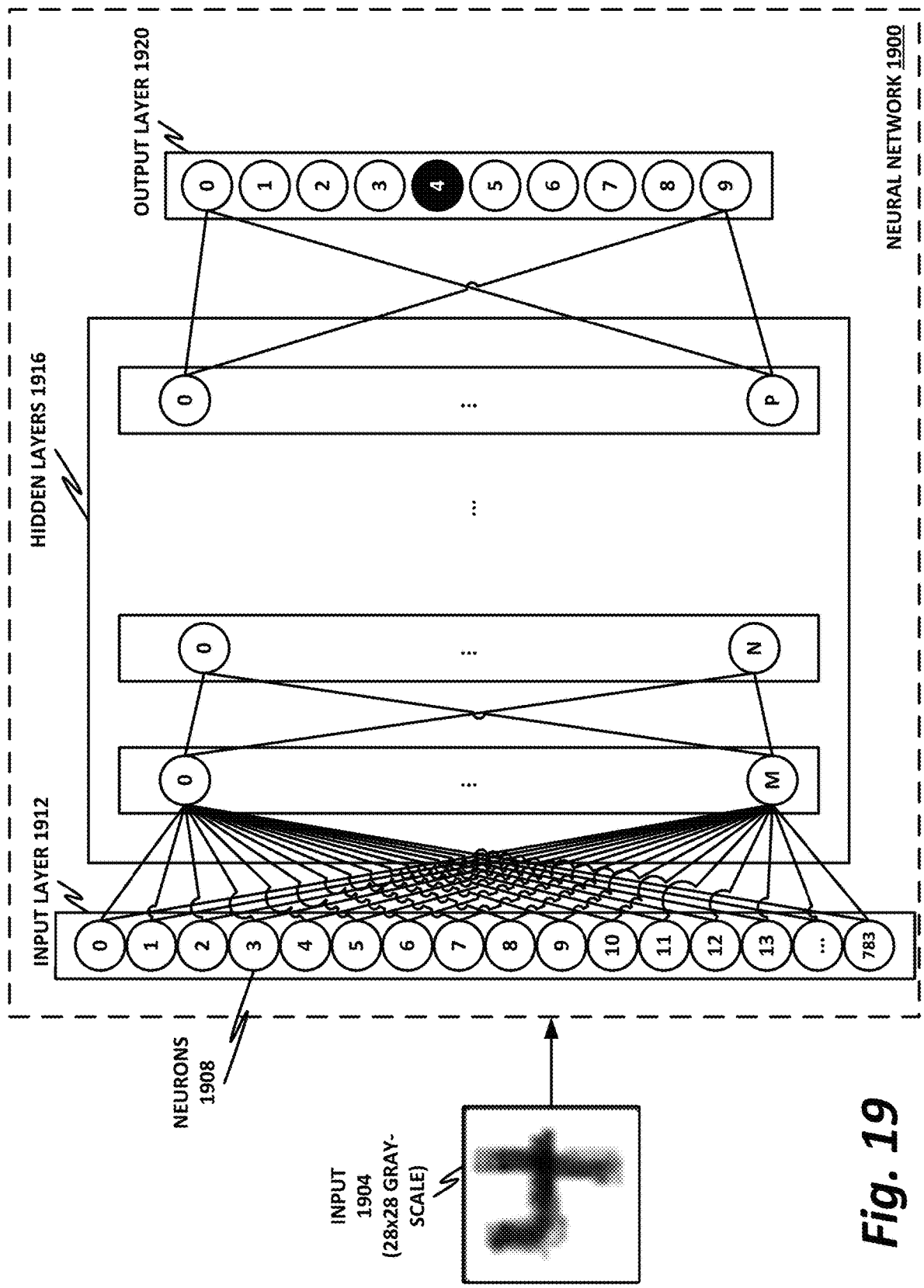
FIG. 19 illustrates machine learning according to a "textbook" problem with real-world applications.
Figure 20:
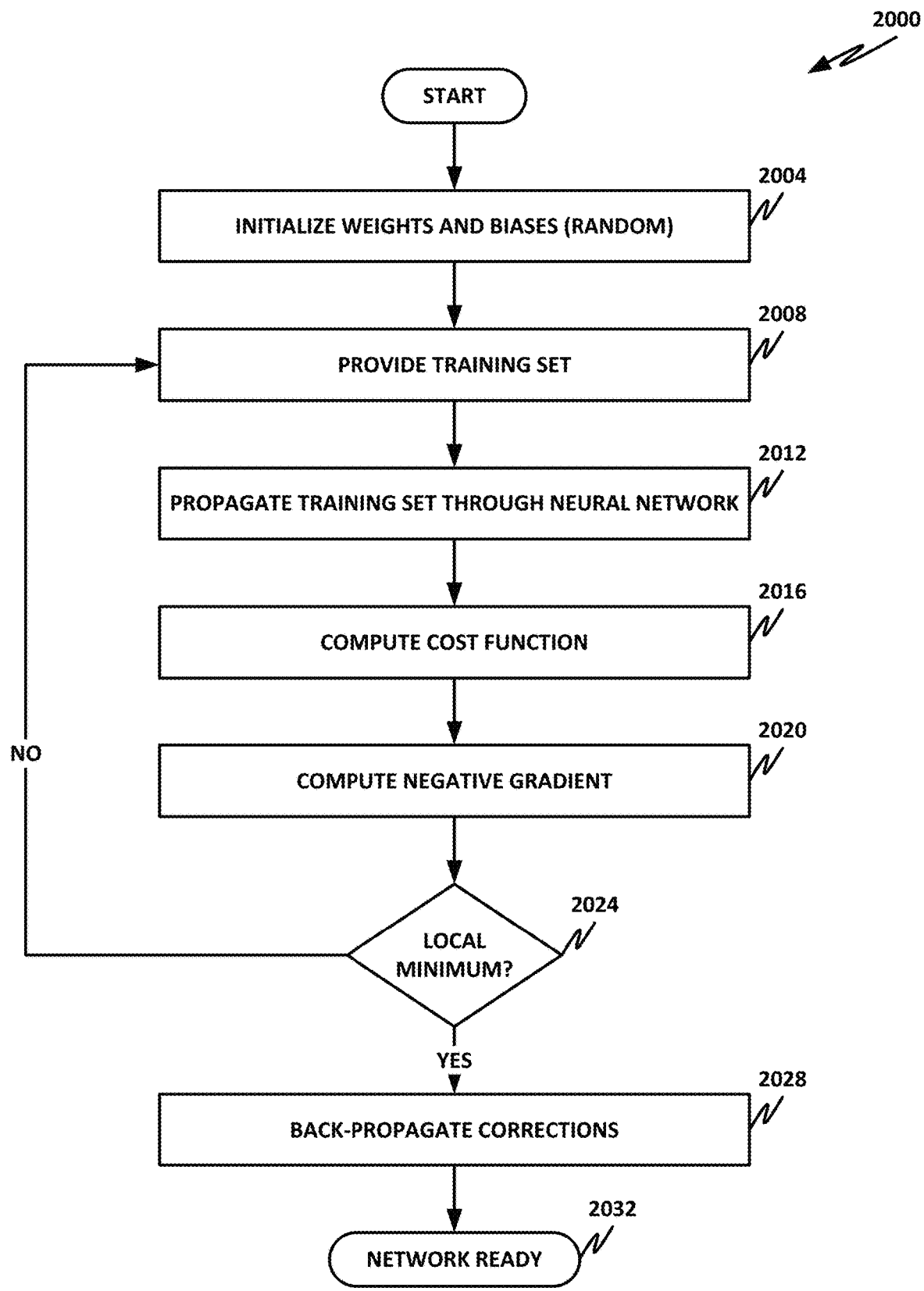
FIG. 20 is a flowchart of a method that may be used to train a neural network.
Figure 21:
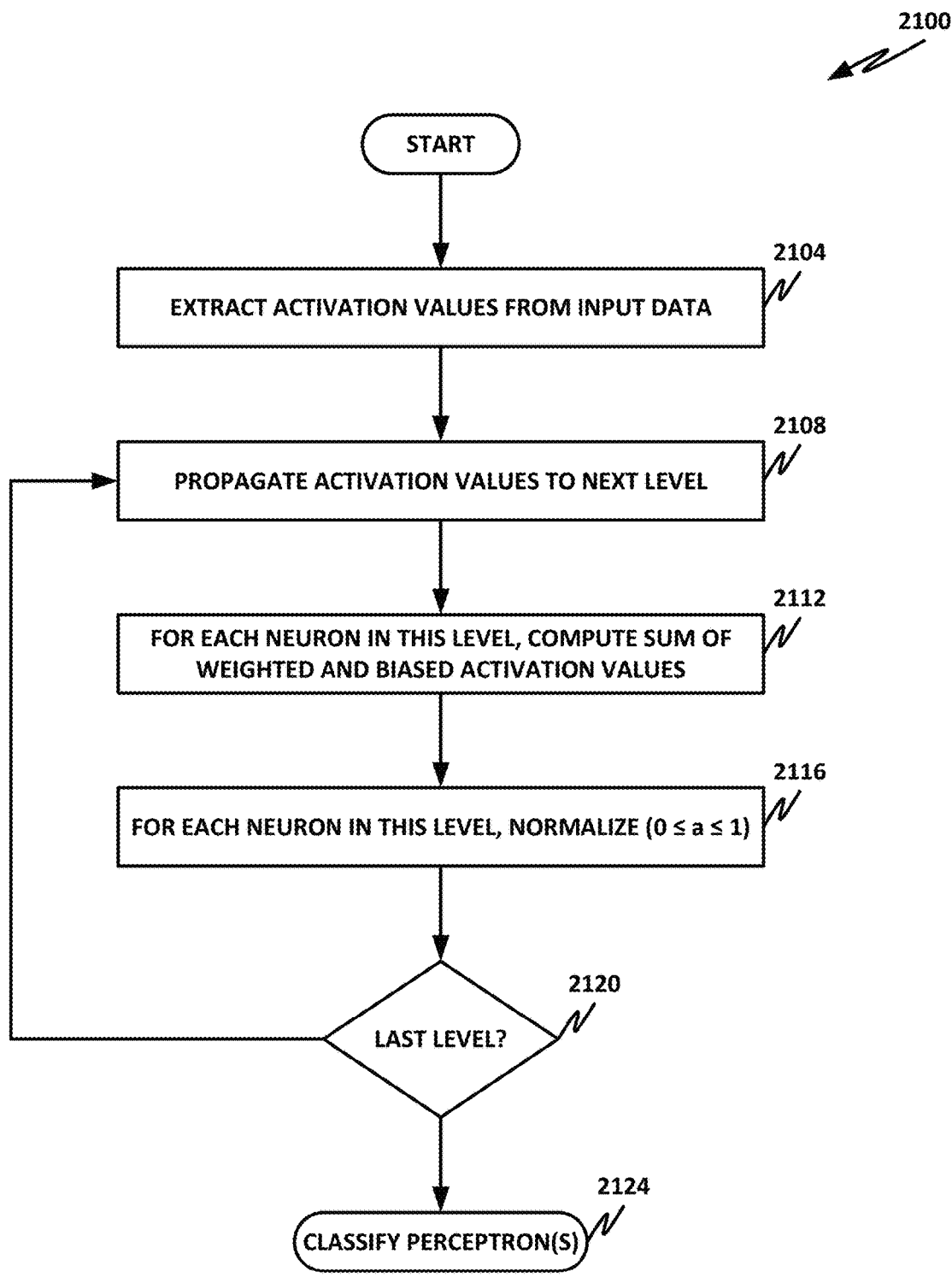
FIG. 21 is a flowchart of a method of using a neural network to classify an object.

FIGS. 19-21 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 19 illustrates machine learning according to a "textbook" problem with real-world applications. In this case, a neural network 1900 is tasked with recognizing characters. To simplify the description, neural network 1900 is tasked only with recognizing single digits in the range of 0 through 9. These are provided as an input image 1904. In this example, input image 1904 is a 28×28-pixel 8-bit grayscale image. In other words, input image 1904 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1900 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1900 includes an input layer 1912 and an output layer 1920. In principle, input layer 1912 receives an input such as input image 1904, and at output layer 1920, neural network 1900 "lights up" a perceptron that indicates which character neural network 1900 thinks is represented by input image 1904.

Between input layer 1912 and output layer 1920 are some number of hidden layers 1916. The number of hidden layers 1916 will depend on the problem to be solved, the available compute resources, and other design factors. In general, the more hidden layers 1916, and the more neurons per hidden layer, the more accurate the neural network 1900 may become. However, adding hidden layers and neurons also increases the complexity of the neural network, and its demand on compute resources. Thus, some design skill is required to determine the appropriate number of hidden layers 1916, and how many neurons are to be represented in each hidden layer 1916.

Input layer 1912 includes, in this example, 784 "neurons" 1908. Each neuron of input layer 1912 receives information from a single pixel of input image 1904. Because input image 1904 is a 28×28 grayscale image, it has 784 pixels. Thus, each neuron in input layer 1912 holds 8 bits of information, taken from a pixel of input layer 1904. This 8-bit value is the "activation" value for that neuron.

Each neuron in input layer 1912 has a connection to each neuron in the first hidden layer in the network. In this example, the first hidden layer has neurons labeled 0 through M. Each of the M+1 neurons is connected to all 784 neurons in input layer 1912. Each neuron in hidden layer 1916 includes a kernel or transfer function, which is described in greater detail below. The kernel or transfer function determines how much "weight" to assign each connection from input layer 1912. In other words, a neuron in hidden layer 1916 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1916, until they reach the last layer, which has P+1 neurons labeled 0 through P. Each of these P+1 neurons has a connection to each neuron in output layer 1920. Output layer 1920 includes a number of neurons known as perceptrons that compute an activation value based on their weighted connections to each neuron in the last hidden layer 1916. The final activation value computed at output layer 1920 may be thought of as a "probability" that input image 1904 is the value represented by the perceptron. For example, if neural network 1900 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1916 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (σ) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1912) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma \left( \begin{bmatrix} w_{0,0} & \ldots & w_{0,n} \\ \vdots & \ddots & \vdots \\ w_{(k,0)} & \ldots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix} \right)$$

More compactly, the full transfer function for layer 1 can be written in vector notation as:

$$a^{(1)} = \sigma(Wa^{(0)} + b)$$

Neural connections and activation values are propagated throughout the hidden layers 1916 of the network in this way, until the network reaches output layer 1920. At output layer 1920, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1920 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 20 is a flowchart of a method 2000. Method 2000 may be used to train a neural network, such as neural network 1900 of FIG. 19.

In block 2004, the network is initialized. Initially, neural network 1900 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 2008, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 2008, the initial training set is provided to the neural network. Alternatively, the full training set could be used in each iteration.

In block 2012, the training data are propagated through the neural network. Because the initial values are random, and are therefore essentially garbage, it is expected that the output will also be a garbage value. In other words, if neural network 1900 of FIG. 19 has not been trained, when input image 1904 is fed into the neural network, it is not expected with the first training set that output layer 1920 will light up perceptron 4. Rather, the perceptrons may have values that are all over the map, with no clear winner, and with very little relation to the number 4.

In block 2016, a cost function is computed as described above. For example, in neural network 1900, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 2020, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 2024, the system determines whether it has reached a local minimum (e.g., whether the gradient has reached 0 within the threshold). If the local minimum has not been reached, then the neural network has not been adequately trained, and control returns to block 2008 with a new training set. The training sequence continues until, in block 2024, a local minimum has been reached.

Now that a local minimum has been reached and the corrections have been back-propagated, in terminal 2032, the neural network is ready.

FIG. 21 is a flowchart of a method 2100. Method 2100 illustrates a method of using a neural network, such as network 1900 of FIG. 19, to classify an object.

In block 2104, the network extracts the activation values from the input data. For example, in the example of FIG. 19, each pixel in input image 1904 is assigned as an activation value to a neuron 1908 in input layer 1912.

In block 2108, the network propagates the activation values from the current layer to the next layer in the neural network. For example, after activation values have been extracted from the input image, those values may be propagated to the first hidden layer of the network.

In block 2112, for each neuron in the current layer, the neuron computes a sum of weighted and biased activation values received from each neuron in the previous layer. For example, in the illustration of FIG. 19, neuron 0 of the first hidden layer is connected to each neuron in input layer 1912. A sum of weighted values is computed from those activation values, and a bias is applied.

In block 2116, for each neuron in the current layer, the network normalizes the activation values by applying a function such as sigmoid, ReLU, or some other function.

In decision block 2120, the network determines whether it has reached the last layer in the network. If this is not the last layer, then control passes back to block 2108, where the activation values in this layer are propagated to the next layer.

Returning to decision block 2120, If the network is at the last layer, then the neurons in this layer are perceptrons that provide final output values for the object. In terminal 2124, the perceptrons are classified and used as output values.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of providing user-sourced reputation adjustments to an artificial intelligence malware detection engine, comprising:
    computing a malware reputation for a first executable software object via the artificial intelligence malware detection engine, wherein the malware reputation accounts for global and local prevalence of the executable software object, wherein the local prevalence comprises prevalence for a first enterprise, and wherein the global prevalence comprises prevalence for a plurality of enterprises different from the first enterprise;
    irrespective of the malware reputation, greenlighting the first executable software object based on an input from a human user, wherein greenlighting is an indication that the first executable object is safe or non-malicious and should be allowed on the first enterprise;
    analyzing a second executable software object within the first enterprise using the artificial intelligence malware detection engine, wherein the second executable software object comprises a portable executable having structured information consisting of a number of API calls, a number of DLL calls, a number of import functions, a number of export functions, a starting virtual address, virtual size, and language, wherein the second executable software object is novel according to a local prevalence model for the first enterprise and is not identical to the first executable software object;
    assigning the second executable software object a malicious or suspicious reputation based on the analyzing
    clustering the second executable software object into a cluster of software objects that includes the first executable software object, wherein clustering comprises computing feature vector distances between software objects; and
    based on the clustering, greenlighting the second executable software object.

2. The method of claim 1, further comprising providing to the human user a user interface to present a feed of greenlit objects.

3. The method of claim 2, wherein the feed of greenlit objects includes similar objects to the greenlit objects.

4. One or more tangible, non-transitory computer-readable storage media having stored thereon executable instructions to:
    compute, from a machine learning engine comprising an object prevalence model, a malware reputation for a first executable software object within a first enterprise;
    apply to the first executable software object an adjusted reputation based on user-sourced feedback;
    identify a second executable software object within the first enterprise, wherein the second executable software object comprises a portable executable having structured information consisting of a number of API calls, a number of DLL calls, a number of import functions, a number of export functions, a starting virtual address, virtual size, and language, wherein the second executable software object is novel according to a local prevalence model for the first enterprise and is not identical to the first executable software object, wherein the local prevalence comprises prevalence for the first enterprise;
    analyze the second executable software object with the machine learning engine and assign to the second executable software object a malicious or suspicious reputation according to the machine learning engine;
    cluster the second executable software object into a cluster of software objects that includes the first executable software object, wherein clustering comprises computing feature vector distances between software objects; and based on the clustering, greenlight the second executable software object.

5. The one or more tangible, non-transitory computer-readable storage media of claim 4, wherein the instructions are further to provide a guest infrastructure to execute at least some of the instructions.

6. The one or more tangible, non-transitory computer-readable storage media of claim 5, wherein the guest infrastructure comprises a virtualization infrastructure.

7. The one or more tangible, non-transitory computer-readable storage media of claim 5, wherein the guest infrastructure comprises a containerization infrastructure.

8. The one or more tangible, non-transitory computer-readable storage media of claim 5, wherein the object prevalence model further comprises a global prevalence model.

9. The one or more tangible, non-transitory computer-readable storage media of claim 5, wherein the user-sourced feedback comprises an assigned reputation for the executable software object.

10. The one or more tangible, non-transitory computer-readable storage media of claim 5, wherein clustering comprising computing a distance between the second executable software object and a next-nearest neighbor.

11. The one or more tangible, non-transitory computer-readable storage media of claim 10, wherein the next-nearest neighbor is an object previously known to the enterprise.

12. The one or more tangible, non-transitory computer-readable storage media of claim 10, wherein the next-nearest neighbor is a previous version of the second executable software object.

13. The one or more tangible, non-transitory computer-readable storage media of claim 5, wherein the instructions are further to retrain the machine learning engine with the user-sourced feedback.

14. A computing apparatus, comprising:
a processor circuit;
a memory; and
instructions encoded within the memory to instruct the processor circuit to:
compute, within a machine learning engine comprising an object prevalence model, a malware reputation for a first executable software object, wherein the malware reputation accounts for both local and global prevalence of the object, wherein the local prevalence comprises prevalence for a first enterprise, and wherein the global prevalence comprises prevalence for a plurality of enterprises different from the first enterprise, and wherein computing the malware reputation comprises analyzing structured information consisting of a number of API calls, a number of DLL calls, a number of import functions, a number of export functions, a starting virtual address, virtual size, and language;

apply to the first executable software object an adjusted reputation based on user-sourced feedback;

identify a second executable software object within the first enterprise, wherein the second executable software object is novel according to the local prevalence for the first enterprise and is not identical to the executable software object;

compute, within the machine-learning engine, a malicious or suspicious reputation for the second executable software object;

cluster the second executable software object into a cluster of software objects that includes the first executable software object, wherein clustering comprises computing feature vector distances between software objects; and based on the clustering, greenlight the second executable software object.

15. The computing apparatus of claim 14, wherein the instructions are further to provide a live backend system.

16. The computing apparatus of claim 15, wherein the live backend system is to measure model accuracy over a plurality of segments.

17. The computing apparatus of claim 16, wherein the plurality of segments includes a segment selected from geographic, industry sector, operating system type, and traffic type.

18. The computing apparatus of claim 14, wherein the object prevalence model further comprises a global prevalence model.

19. The computing apparatus of claim 14, wherein the user-sourced feedback comprises an assigned reputation for the second executable software object.

20. The computing apparatus of claim 14, wherein the user-sourced feedback comprises green-lighting, yellow-lighting, or red-lighting the second executable software object.

* * * * *